(12) United States Patent
Endo et al.

(10) Patent No.: US 12,101,021 B2
(45) Date of Patent: Sep. 24, 2024

(54) INTEGRATED CIRCUIT AND POWER SUPPLY CIRCUIT

(71) Applicant: FUJI ELECTRIC CO., LTD., Kawasaki (JP)

(72) Inventors: Yuta Endo, Matsumoto (JP); Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 360 days.

(21) Appl. No.: 17/707,317

(22) Filed: Mar. 29, 2022

(65) Prior Publication Data
US 2022/0224218 A1 Jul. 14, 2022

Related U.S. Application Data

(63) Continuation of application No. PCT/JP2021/008517, filed on Mar. 4, 2021.

(30) Foreign Application Priority Data

Apr. 15, 2020 (JP) .................................. 2020-072678

(51) Int. Cl.
*H02M 1/08* (2006.01)
*H02M 1/00* (2006.01)
(Continued)

(52) U.S. Cl.
CPC ........... *H02M 1/081* (2013.01); *H02M 1/007* (2021.05); *H02M 1/08* (2013.01); *H02M 1/083* (2013.01);
(Continued)

(58) Field of Classification Search
CPC ........ H02M 1/08; H02M 1/081; H02M 1/083; H02M 1/007; H02M 1/126; H02M 1/42;
(Continued)

(56) References Cited

U.S. PATENT DOCUMENTS 9,065,327 B2 * 6/2015 Hampo ............... H02M 1/4225
10,511,219 B2 * 12/2019 Matsuura ............. H02M 7/219
(Continued)

FOREIGN PATENT DOCUMENTS

CN 110011531 A * 7/2019 ............. G01R 15/20
JP 2000-308353 A 11/2000
(Continued)

OTHER PUBLICATIONS

International Search Report for PCT/JP2021/008517, mailed on May 18, 2021.

*Primary Examiner* — Thienvu V Tran
*Assistant Examiner* — Shahzeb K Ahmad
(74) *Attorney, Agent, or Firm* — Rabin & Berdo, P.C.

(57) ABSTRACT

An integrated circuit for a power supply circuit configured to generate an output voltage of a target level from an alternating current (AC) voltage. The power supply circuit includes a first capacitor and an inductor configured to receive a voltage according to the AC voltage, and a transistor configured to control an inductor current flowing through the inductor. The integrated circuit is configured to switch the transistor, and includes: an identification circuit configured to identify whether a voltage level of an effective (Continued)

value of the AC voltage is a first level or a second level, and a signal output circuit configured to output a driving signal to drive the transistor, and correct the driving signal to thereby correct the input current, in response to the voltage level of the effective value being the first level and the second level, respectively.

20 Claims, 28 Drawing Sheets

(51) Int. Cl.
    *H02M 1/12*         (2006.01)
    *H02M 1/42*         (2007.01)
    *H02M 7/04*         (2006.01)
    *H02M 7/217*       (2006.01)

(52) U.S. Cl.
    CPC ......... *H02M 1/126* (2013.01); *H02M 1/4225* (2013.01); *H02M 1/4241* (2013.01); *H02M 7/05* (2021.05); *H02M 7/2176* (2013.01); *H02M 1/4208* (2013.01)

(58) Field of Classification Search
    CPC .. H02M 1/4225; H02M 1/4208; H02M 1/425; H02M 1/4258; H02M 1/4241; H02M 7/05; H02M 7/155; H02M 7/1555; H02M 7/217; H02M 7/2176
    See application file for complete search history.

(56) References Cited

U.S. PATENT DOCUMENTS

| | | | |
|---|---|---|---|
| 10,622,887 B1* | 4/2020 | Xiong | H02M 3/33523 |
| 11,050,343 B2* | 6/2021 | Takegami | G01R 19/16585 |
| 11,245,338 B2* | 2/2022 | Deng | H02M 7/10 |
| 2005/0162143 A1 | 7/2005 | Fukumoto et al. | |
| 2016/0181942 A1 | 6/2016 | Sugawara | |
| 2016/0241134 A1* | 8/2016 | Maruyama | H02M 1/4225 |
| 2017/0366090 A1 | 12/2017 | Sugawara | |
| 2019/0305664 A1 | 10/2019 | Iyasu et al. | |

FOREIGN PATENT DOCUMENTS

| | | |
|---|---|---|
| JP | 3988724 B2 | 10/2007 |
| JP | 4580849 B2 | 11/2010 |
| JP | 2015-039261 A | 2/2015 |
| JP | 2016-119761 A | 6/2016 |
| JP | 2017-225260 A | 12/2017 |
| JP | 2019-180178 A | 10/2019 |
| JP | 6599024 B2 | 10/2019 |

\* cited by examiner

INTEGRATED CIRCUIT AND POWER SUPPLY CIRCUIT

CROSS-REFERENCE TO RELATED APPLICATIONS

This is a continuation application of International Patent Application No. PCT/JP2021/008517 filed Mar. 4, 2021, which claims the benefit of priority to Japanese Patent Application No. 2020-072678 filed Apr. 15, 2020, the entire contents of each of which the entire contents of each of which are incorporated herein by reference.

BACKGROUND

Technical Field

The present disclosure relates to an integrated circuit and a power supply circuit.

Description of the Related Art

Some general integrated circuits correct the power factor by shaping the waveforms of input currents and alternating current (AC) voltages so as to be similar in figure (for example, Japanese Patent Publications Nos. 6599024 and 4580849 and Japanese Unexamined Patent Application Publication No. 2015-039261).

Meanwhile, application of the AC voltage to an input capacitor of an AC-DC converter may cause distortion in the input current, resulting in degradation of the power factor.

SUMMARY

A first aspect of an embodiment of the present disclosure is an integrated circuit for a power supply circuit configured to generate an output voltage of a target level from an alternating current (AC) voltage, the power supply circuit including a first capacitor and an inductor that are configured to receive a rectified voltage according to the AC voltage, and a transistor configured to control an inductor current flowing through the inductor, the integrated circuit being configured to switch the transistor, the integrated circuit comprising: an identification circuit configured to identify whether a voltage level of an effective value of the AC voltage is a first level or a second level higher than the first level; and a signal output circuit configured to output a driving signal to drive the transistor, in response to the voltage level of the effective value being the first level, and correct the driving signal to thereby correct the input current of the power supply circuit and output the corrected driving signal, in response to the voltage level of the effective value being the second level.

A second aspect of an embodiment of the present disclosure is a power supply circuit configured to generate an output voltage of a target level from an alternating current (AC) voltage, the power supply circuit comprising: a first capacitor and an inductor that are configured to receive a rectified voltage according to the AC voltage; a transistor configured to control an inductor current flowing though the inductor; an identification circuit configured to identify whether a voltage level of an effective value of the AC voltage is a first level or a second level higher than the first level; and a signal output circuit configured to output a driving signal to drive the transistor, in response to the voltage level of the effective value being the first level, and correct the driving signal to thereby correct the input current of the power supply circuit and output the corrected driving signal, in response to the voltage level of the effective value being the second level.

A third aspect of an embodiment of the present disclosure is an integrated circuit for a power supply circuit configured to generate an output voltage of a target level from an alternating current (AC) voltage, the power supply circuit including a first rectifier circuit configured to perform full-wave rectification to the AC voltage to thereby generate a first rectified voltage, a first capacitor and an inductor that are configured to receive the first rectified voltage, and a transistor configured to control an inductor current flowing through the inductor, the integrated circuit being configured to switch the transistor, the integrated circuit comprising: a signal output circuit configured to, in response to a phase angle of the first rectified voltage being in a range from a first phase angle to a second phase angle, output a driving signal such that a time period during which the transistor is on is longer than a time period during which the phase angle is smaller than the first phase angle; and a driver circuit configured to drive the transistor in response to the driving signal.

A forth aspect of an embodiment of the present disclosure is a power supply circuit configured to generate an output voltage of a target level from an alternating current (AC) voltage, the power supply circuit comprising: a first rectifier circuit configured to perform full-wave rectification to the AC voltage to thereby generate a first rectified voltage; a first capacitor and an inductor that are configured to receive the first rectified voltage; a transistor configured to control an inductor current flowing through the inductor; a signal output circuit configured to, in response to a phase angle of the first rectified voltage being in a range from a first phase angle to a second phase angle, output a driving signal such that a time period during which the transistor is on is longer than a time period during which the phase angle is smaller than the first phase angle; and a driver circuit configured to drive the transistor in response to the driving signal.

A fifth aspect of an embodiment of the present disclosure is an integrated circuit for a power supply circuit configured to generate an output voltage of a target level from an alternating current (AC) voltage, the power supply circuit including a first rectifier circuit configured to perform full-wave rectification to the AC voltage to thereby generate a first rectified voltage, a phase angle of the first rectified voltage being in a range that includes first to fourth phase angles; a first capacitor and an inductor that are configured to receive the first rectified voltage, and a transistor configured to control an inductor current flowing through the inductor, the integrated circuit being configured to switch the transistor, the integrated circuit comprising: a signal output circuit configured to stop outputting a driving signal, while the phase angle of the first rectified voltage changes from the third phase angle to the fourth phase angle, and output the driving signal, after the phase angle of the first rectified voltage reaches the fourth phase angle; and a driver circuit configured to drive the transistor in response to the driving signal.

A sixth aspect of an embodiment of the present disclosure is a power supply circuit configured to generate an output voltage of a target level from an alternating current (AC) voltage, the power supply circuit comprising: a first rectifier circuit configured to perform full-wave rectification to the AC voltage to thereby generate a first rectified voltage, a phase angle of the first rectified voltage being in a range that includes first to fourth phase angles; a first capacitor and an inductor that are configured to receive the first rectified voltage; a transistor configured to control an inductor current flowing through the inductor; a signal output circuit configured to stop outputting a driving signal, while the phase angle of the first rectified voltage changes from the third phase angle to the fourth phase angle, and output the driving signal, after the phase angle of the first rectified voltage reaches the fourth phase angle; and a driver circuit configured to drive the transistor in response to the driving signal.

A seventh aspect of an embodiment of the present disclosure is an integrated circuit for a power supply circuit configured to generate an output voltage of a target level from an alternating current (AC) voltage, the power supply circuit including a first capacitor and an inductor that are configured to receive a voltage according to the AC voltage, and a transistor configured to control an inductor current flowing through the inductor, the integrated circuit being configured to switch the transistor, the integrated circuit comprising: a signal output circuit configured to output a driving signal such that the input current increases as a state of a load of the power supply transitions to a light load state; and a driver circuit configured to drive the transistor in response to the driving signal.

A eighth aspect of an embodiment of the present disclosure is a power supply circuit configured to generate an output voltage of a target level from an alternating current (AC) voltage, the power supply circuit comprising: a first capacitor and an inductor that are configured to receive a voltage according to the AC voltage; a transistor configured to control an inductor current flowing through the inductor; a signal output circuit configured to output a driving signal such that the input current increases as a state of a load of the power supply circuit transitions to a light load state; and a driver circuit configured to drive the transistor in response to the driving signal.

A ninth aspect of an embodiment of the present disclosure is an integrated circuit for a power supply circuit configured to generate an output voltage of a target level from an alternating current (AC) voltage, the power supply circuit including a first capacitor and an inductor that are configured to receive a voltage according to the AC voltage, and a transistor configured to control an inductor current flowing through the inductor, the integrated circuit being configured to switch the transistor, the integrated circuit comprising: an adjustment circuit configured to alter at least one of a feedback voltage according to the output voltage or a reference voltage according to the target level, so as to decrease the target level of the output voltage; a signal output circuit configured to output a driving signal, based on the feedback voltage and the reference voltage; and a driver circuit configured to drive the transistor in response to the driving signal.

A tenth aspect of an embodiment of the present disclosure is a power supply circuit configured to generate an output voltage of a target level from an alternating current (AC) voltage, the power supply circuit comprising: a first capacitor and an inductor that are configured to receive a voltage according to the AC voltage; a transistor configured to control an inductor current flowing through the inductor; an adjustment circuit configured to alter at least one of a feedback voltage according to the output voltage or a reference voltage according to the target level, so as to decrease the target level of the output voltage; a signal output circuit configured to output a driving signal, based on the feedback voltage and the reference voltage; and a driver circuit configured to drive the transistor in response to the driving signal.

BRIEF DESCRIPTION OF THE DRAWINGS

FIG. 13 is a diagram illustrating an example of a correction circuit 71a.

FIG. 14 is a diagram illustrating an example of an off-signal output circuit 82a.

FIG. 15 is a diagram for explaining the operation of a power factor correction IC 26 including a correction circuit 71a and an off-signal output circuit 82a.

FIG. 16 is a diagram illustrating changes in input current Iin when using a power factor correction IC 26 including a correction circuit 71a and an off-signal output circuit 82a.

DETAILED DESCRIPTION

At least following matters will become apparent from descriptions of the present specification and the accompanying drawings.

====Embodiments====

Figure 1:
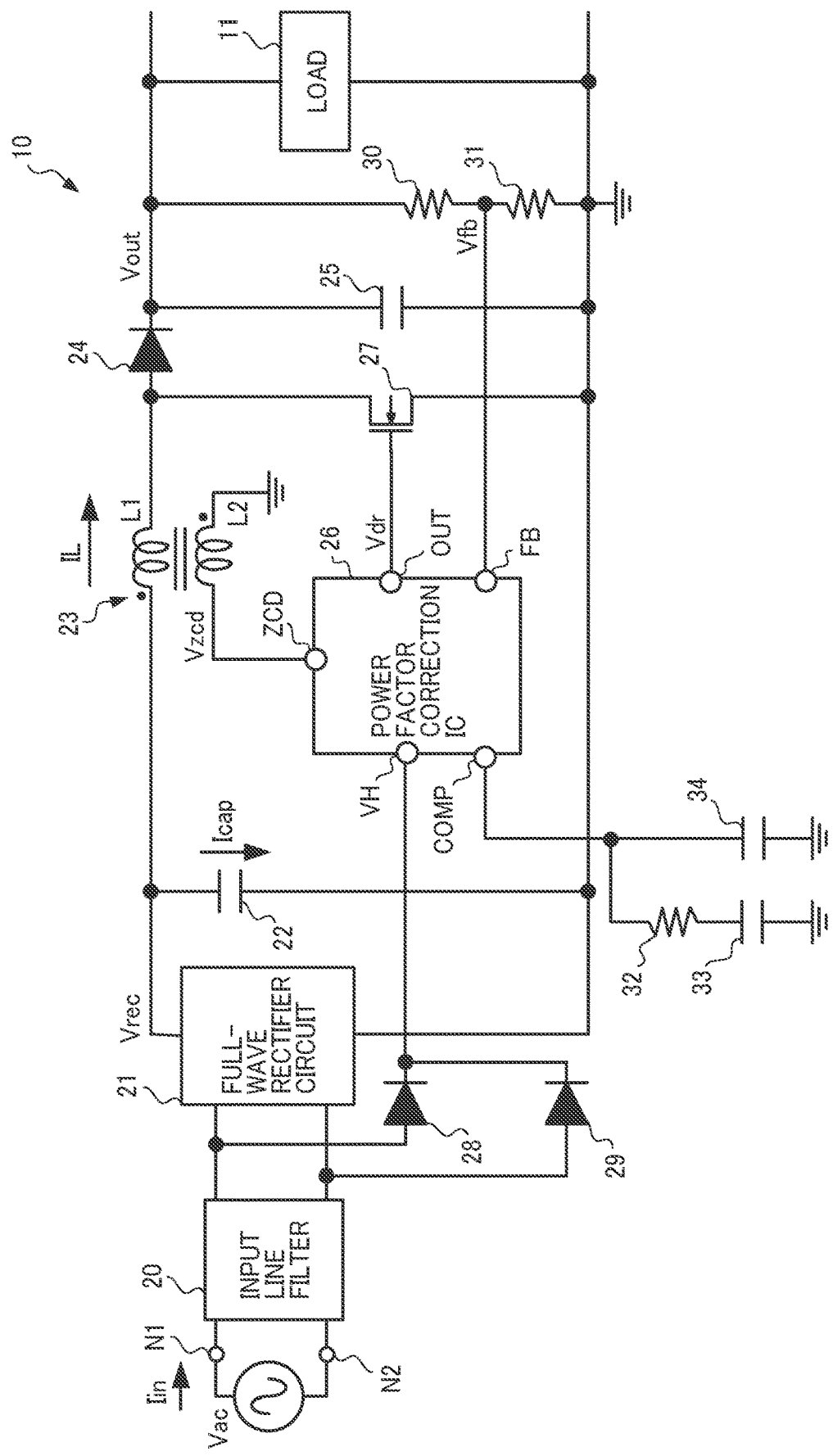
FIG. 1 is a diagram illustrating an example of an AC-DC converter 10.

FIG. 1 is a diagram illustrating a configuration example of an AC-DC converter 10 which is an embodiment of the present disclosure. The AC-DC converter 10 is a boost chopper-type power supply circuit that generates an output voltage Vout of a target level from an alternating-current (AC) voltage Vac of a commercial power supply.

A load 11 is a DC-DC converter or an electronic device that operates with a direct-current (DC) voltage, for example.

<<<Overview of AC-DC Converter 10>>>

The AC-DC converter 10 includes an input line filter 20, a full-wave rectifier circuit 21, capacitors 22, 25, 33, and 34, a transformer 23, diodes 24, 28, and 29, a power factor correction IC 26, an N-channel metal-oxide-semiconductor (NMOS) transistor 27, and resistors 30 to 32.

The input line filter 20 is provided between the full-wave rectifier circuit 21 (described later) and nodes N1 and N2 that receive the AC voltage Vac, and is a circuit to remove noise from the commercial power supply to the AC-DC converter 10. Note that, in an embodiment of the present disclosure, the current at the node N1, N2 that receive the AC voltage Vac is referred to as an input current Iin.

Herein, the AC voltage Vac is a voltage of 100 to 277 V with a frequency of 50 to 60 Hz, for example.

Figure 2:
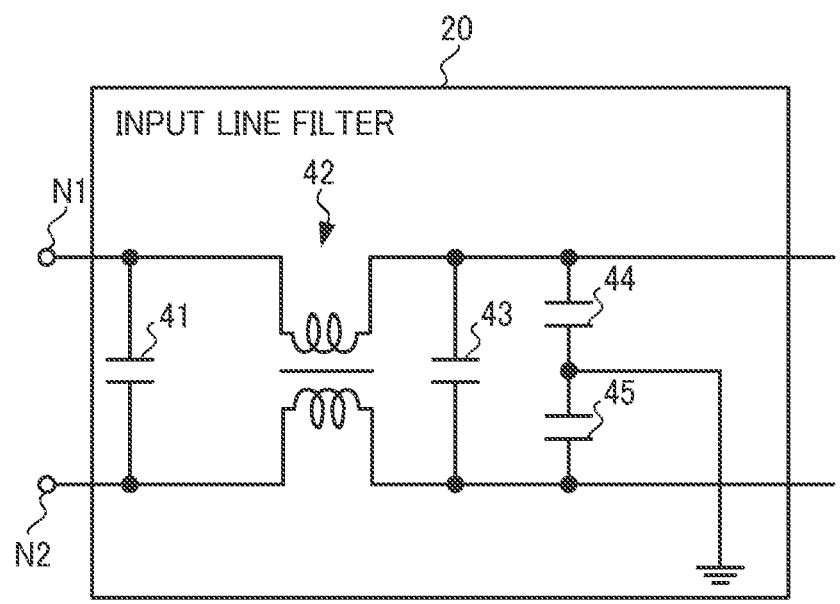
FIG. 2 is a diagram illustrating an example of an input line filter 20.

The input line filter 20 will be described with reference to FIG. 2. The input line filter 20 includes capacitors 41, 43, 44, and 45 and a choke coil 42. The capacitors 41 and 43 are X capacitors to remove normal mode noise. The choke coil 42 and capacitors 44 and 45 serve as a filter to remove common mode noise.

Returning to FIG. 1, the full-wave rectifier circuit full-wave rectifies the predetermined AC voltage Vac from which noise has been removed, and applies the resultant voltage, as a rectified voltage Vrec, to the capacitor 22 and a primary coil L1 of the transformer 23.

Note that the rectified voltage Vrec is directly applied to the primary coil L1 but may be applied to the primary coil L1 via an element such as a resistor (not illustrated). In addition, in an embodiment of the present disclosure, "to apply voltage" includes to directly supply voltage to a predetermined node as well as to indirectly supply voltage through an element such as a resistor (not illustrated) and to supply voltage obtained by voltage division.

The capacitor 22 is an element to smooth the rectified voltage Vrec and is charged with a charge current Icap. The transformer 23 includes the primary coil L1 and a secondary coil L2 magnetically coupled to the primary coil L1. Herein, in an embodiment of the present disclosure, the secondary coil L2 is formed by winding such that voltage induced in the secondary coil L2 has a polarity opposite to the polarity of voltage induced in the primary coil L1. Voltage Vzcd induced in the secondary coil L2 is applied to a terminal ZCD of the power factor correction IC 26 (described later).

The primary coil L1 configures a boost chopper circuit with the diode 24, capacitor 25, and NMOS transistor 27. Thus, the charge voltage of the capacitor 25 results in being DC output voltage Vout. The output voltage Vout is 400 V, for example.

The power factor correction IC 26 is an integrated circuit that controls switching of the NMOS transistor 27 such that the level of the output voltage Vout is the target level (400 V, for example) while correcting the power factor of the AC-DC converter 10. Specifically, the power factor correction IC 26 drives the NMOS transistor 27 based on an inductor current IL flowing through the primary coil L1 and the output voltage Vout.

The power factor correction IC 26, which will be described later in detail, has the terminals FB, ZCD, COMP, OUT, and VH. The power factor correction IC 26 has some other terminals in addition to the aforementioned five terminals FB, ZCD, COMP, OUT, and VH, but are omitted here for convenience.

The NMOS transistor 27 is a transistor to control power to the load 11 of the AC-DC converter 10. Note that, in an embodiment of the present disclosure, the NMOS transistor 27 is a metal oxide semiconductor (MOS) transistor, but is not limited to the MOS transistor. The NMOS transistor 27 may be a bipolar transistor, for example, as long as it is a transistor capable of controlling power. The NMOS transistor 27 has a gate electrode that is coupled so as to be driven with a signal from the terminal OUT.

The resistors 30 and 31 configure a voltage divider circuit that divides the output voltage Vout, to generate a feedback voltage Vfb used in switching the NMOS transistor 27. The feedback voltage Vfb, which is generated at a node at which the resistors 30 and 31 are coupled, is applied to the terminal FB.

The resistor 32 and capacitors 33 and 34 are elements for phase compensation of the power factor correction IC 26, which is feedback-controlled. Between the terminal COMP and the ground, the resistor 32 and capacitor 33 are provided in series, and the capacitor 34 is provided in parallel with them.

The diodes 28 and 29 configure a full-wave rectifier circuit. The diodes 28 and 29 are coupled to nodes in a previous stage of the full-wave rectifier circuit 21, to apply the voltage Vh according to the AC voltage Vac to the terminal VH of the power factor correction IC 26. The voltage Vh is obtained by rectifying the AC voltage Vac from the nodes in a previous stage of the full-wave rectifier circuit 21. This makes it possible to more precisely detect the phase angle of the voltage Vh without the influence of the capacitor 22. Specifically, the anode of the diode 28 is coupled to a non-grounded line in a previous stage of the full-wave rectifier circuit 21. On the other hand, the anode of the diode 29 is coupled to a grounded line in the previous stage of the full-wave rectifier circuit 21. The cathodes of the diodes 28 and 29 are coupled to each other to be coupled to the terminal VH of the power factor correction IC 26. A divided voltage obtained by dividing the voltage of the cathodes of the diodes 28 and 29 may be applied to the terminal VH of the power factor correction IC 26.

Herein, the diodes 28 and 29 correspond to a "first rectifier circuit", and the voltage Vh according to the AC voltage Vac corresponds to a "first rectified voltage". The full-wave rectifier circuit 21 corresponds to a "second rectifier circuit", and the rectified voltage Vrec corresponds to a "second rectified voltage". The primary coil L1 corresponds to an "inductor", and the current flowing through the primary coil L1 is referred to as "inductor current IL". The capacitor 22 corresponds to a "first capacitor", and the capacitors 33 and 34 correspond to a "second capacitor".

<<<Configuration of Power Factor Correction IC 26>>>

Figure 3:
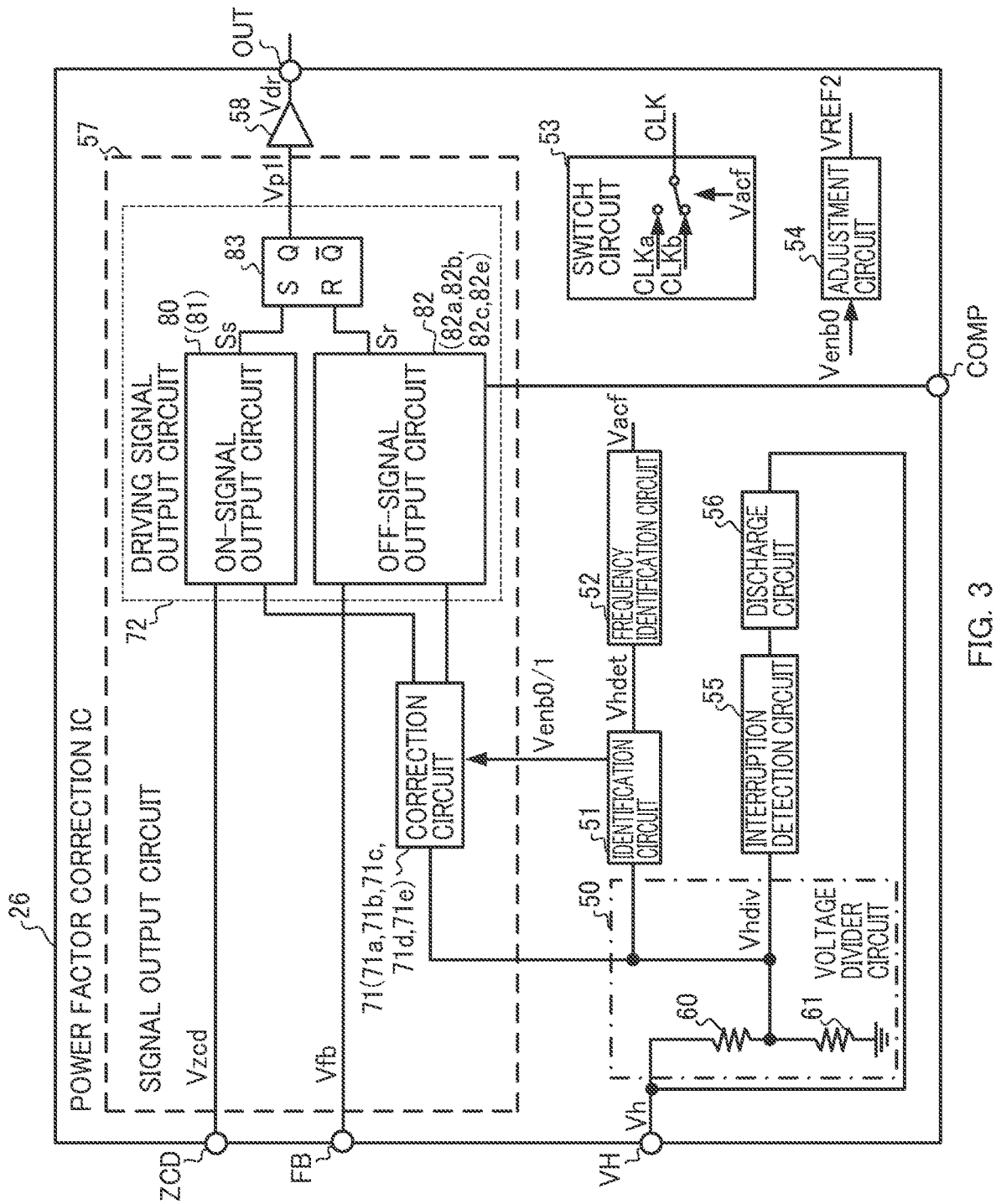
FIG. 3 is a diagram illustrating an example of a power factor correction IC 26.

FIG. 3 is a diagram illustrating an example of the power factor correction IC 26. The power factor correction IC 26 includes a voltage divider circuit 50, an identification circuit 51, a frequency identification circuit 52, a switch circuit 53, an adjustment circuit 54, an interruption detection circuit 55, and a discharge circuit 56, a signal output circuit 57, and a driver circuit 58. In FIG. 3, the terminals are illustrated at positions different from the positions thereof in FIG. 1 for convenience, however, the lines, devices, elements, and the like coupled to the terminals are similarly illustrated between FIGS. 1 and 3.

<<<<Voltage Divider Circuit 50>>>>

Figure 4:
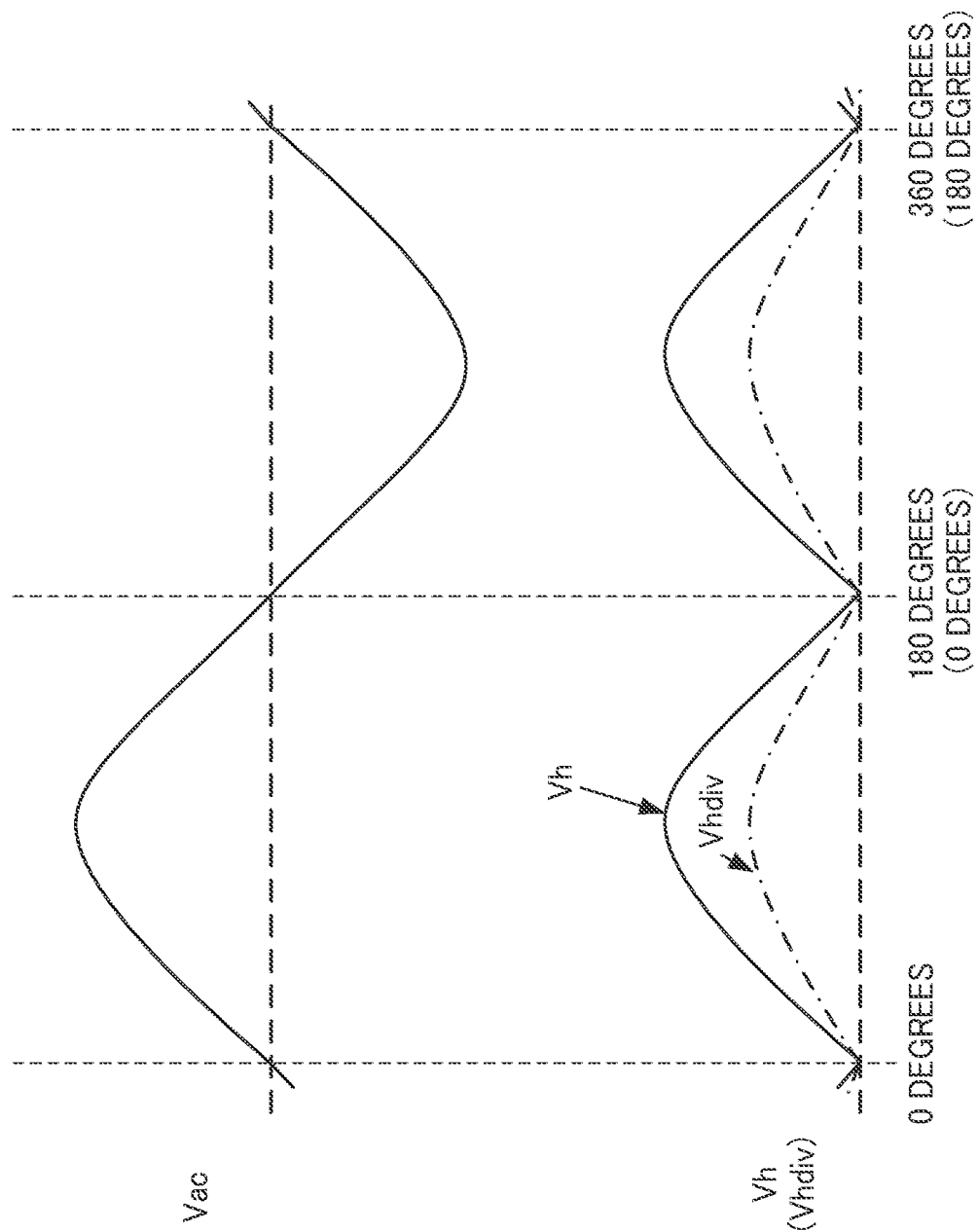
FIG. 4 is a diagram illustrating a relationship between alternating current (AC) voltage Vac, voltage Vh, and divided voltage Vhdiv.

FIG. 4 is a diagram illustrating a relationship between the AC voltage Vac, the voltage Vh obtained by full-wave rectifying the AC voltage Vac, and the divided voltage Vhdiv generated by the voltage divider circuit 50. The voltage divider circuit 50 divides the voltage Vh, to thereby generate the divided voltage Vhdiv, and includes resistors 60 and 61. Specifically, the resistor 60 has one end coupled to the terminal VH, and the other end coupled in series with one end of the resistor 61 having the other end grounded. The divided voltage Vhdiv is generated at the node at which the resistors 60 and 61 are coupled. The voltage level of the AC voltage Vac periodically changes with the phase angle, and the voltage levels of voltage Vh and the divided voltage Vhdiv also periodically change with the phase angle. Specifically, the level of the AC voltage Vac rises as the phase angle increases from 0 to 90 degrees, and drops as the phase angle increases from 90 to 270 degrees. The level of the AC voltage Vac rises as the phase angle increases from 270 to 360 degrees. Meanwhile, the level of the voltage Vh rises as the phase angle increases from 0 to 90 degrees, and drops as the phase angle increases from 90 degrees to 180 degrees. The level of the voltage Vh changes as the phase angle increases 180 to 360 degrees in the same way as when the phase angle increases 0 to 180 degrees. The divided voltage Vhdiv is obtained by dividing the voltage Vh, and thus periodically changes with the phase angle similarly to the voltage Vh.

In an example described herein, the voltage divider circuit 50 is provided in the power factor correction IC 26. However, a configuration may be such that a voltage divider circuit is provided outside the power factor correction IC 26, and the AC voltage Vac is rectified by the diodes 28 and 29 and then divided by the voltage divider circuit, to be applied to the terminal VH. Furthermore, the resistors in the voltage divider circuit 50 have been described as the resistors 60 and 61 in the above but are not limited thereto. The resistors in the voltage divider circuit 50 may include a combination of any number of resistors. Note that the terminal VH corresponds to a "terminal".

<<<<Identification Circuit 51>>>>

Figure 5:
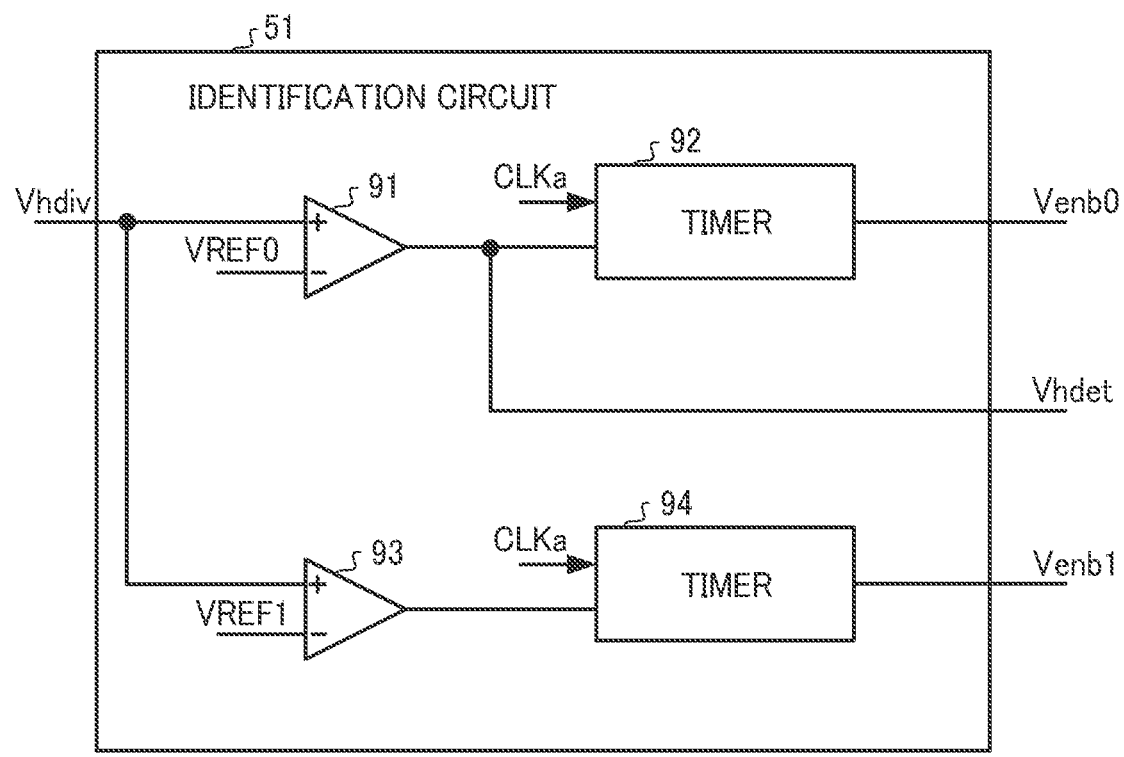
FIG. 5 is a diagram illustrating an example of an identification circuit 51.
Figure 6:
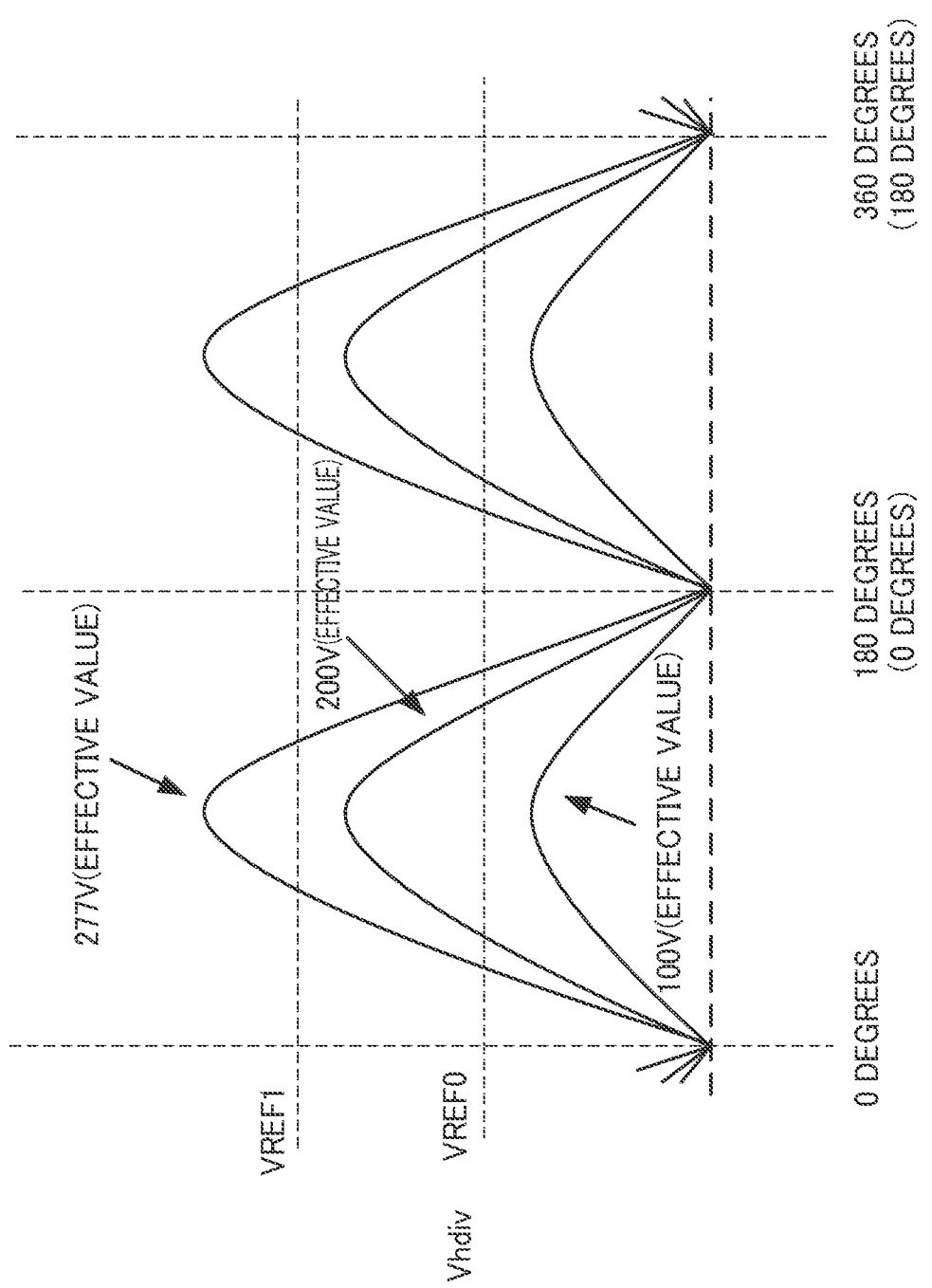
FIG. 6 is a diagram illustrating a relationship between effective values of an AC voltage Vac and reference voltages VREF0 and VREF1.

FIG. 5 is a diagram illustrating an example of the identification circuit 51. The identification circuit 51 compares the divided voltage Vhdiv with reference voltages VREF0 and VREF1, to thereby identify the voltage level of the effective value of the AC voltage Vac. Specifically, the effective value of the AC voltage Vac is 100, 200, or 277 V, and the identification circuit 51 identifies the voltage level of the effective value of the AC voltage Vac among them, with the reference voltages VREF0 and VREF1 being set, as illustrated in FIG. 6.

The identification circuit 51 includes comparators 91 and 93 and timers 92 and 94. The comparator 91 outputs a high-level (hereinafter, referred to as high or high level) signal Vhdet in response to the divided voltage Vhdiv exceeding the reference voltage VREF0. On the other hand, the comparator 91 outputs a low-level (hereinafter, referred to as low or low level) signal Vhdet in response to the divided voltage Vhdiv dropping below the reference voltage VREF0. Upon receiving the low signal Vhdet, the timer 92 starts counting based on a clock signal CLKa. Thus, in response to the divided voltage Vhdiv being lower than the reference voltage VREF0, the timer 92 counts a predetermined number of times. After counting the predetermined number of times, the timer 92 outputs a high signal Venb0. On the other hand, in response to the divided voltage Vhdiv exceeding the reference voltage VREF0 and the high signal Vhdet is inputted to the timer 92, the timer 92 is reset to stop counting and does not count the predetermined number of times. Accordingly, the timer 92 outputs the low signal Venb0. In other words, in response to the divided voltage Vhdiv being lower than the reference voltage VREF0, the timer 92 outputs the high signal Venb0, which indicates that the effective value of the AC voltage Vac is 100 V. In response to the divided voltage Vhdiv exceeding the reference voltage VREF0, the timer 92 outputs the low signal Venb0, which indicates that the effective value of the AC voltage Vac is 200 V.

Similarly to the timer 92, in response to the output of the comparator 93, and to whether the output of the comparator 93 is low while the timer 94 is counting a predetermined number of times, the timer 94 outputs the high signal Venb1, which indicates that the effective value of the AC voltage Vac is 200 or 100 V, or outputs the low signal Venb1, which indicates that the effective value of the AC voltage Vac is 277 V.

Note that the aforementioned 100 V corresponds to a "first level", 200 V corresponds to a "second level", and 277 V corresponds to a "third level". Although the effective value of the AC voltage Vac is 100, 200, or 277 V herein for convenience of explanation, the effective value of the AC voltage Vac to be identified by the identification circuit 51 is not limited to these values.

<<<<Frequency Identification Circuit 52>>>>

Figure 7:
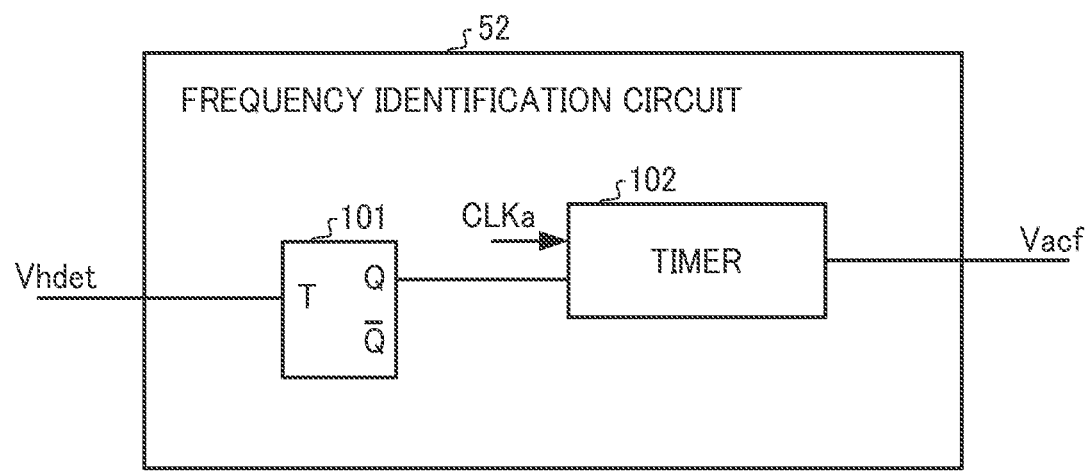
FIG. 7 is a diagram illustrating an example of a frequency identification circuit 52.

FIG. 7 is a diagram illustrating an example of the frequency identification circuit 52. The frequency identification circuit 52 includes a toggle (T) flip-flop 101 and a timer 102. The frequency identification circuit 52 identifies the frequency of the AC voltage Vac (50 or 60 Hz, for example) based on the signal Vhdet from the identification circuit 51.

Specifically, the T flip-flop 101 outputs a signal that is inverted at each rising edge of the signal Vhdet. The timer 102 is reset in response to the signal from the T flip-flop 101. When the frequency of the AC voltage Vac is, for example, 50 Hz, both the time period during which the timer 102 is reset and the time period during which the reset of the timer 102 is released are longer than when the frequency is 60 Hz. Thus, the timer 102 counts a predetermined number of times and outputs a high signal Vacf. Meanwhile, when the frequency of the AC voltage Vac is 60 Hz, the time period during which the reset of the timer 102 is released is shorter than when the frequency of the AC voltage Vac is 50 Hz, for example. Thus, the timer 102 outputs the low signal Vacf without counting the predetermined number of times. The time period during which the signal Vhdet is high is almost the same between the cases where the effective value of the AC voltage Vac is 200 V and 277 V. Accordingly, the frequency of the AC voltage Vac can be properly identified with such a configuration as described above.

Note that the above-described 50 Hz corresponds to a "first frequency", and 60 Hz corresponds to a "second frequency".

<<<<Switch Circuit 53>>>>

Returning to FIG. 3, in response to the signal Vacf from the frequency identification circuit 52, the switch circuit 53 selects a clock signal CLKa or a clock signal CLKb having a frequency higher than that of the clock signal CLKa, and outputs the resultant signal as a clock signal CLK. Specifically, the switch circuit 53 outputs the clock signal CLKa as the clock signal CLK in response to the signal Vacf being high, and outputs the clock signal CLKb as the clock signal CLK in response to the signal Vacf being low. Note that the clock signal CLKa corresponds to a "first clock signal", and the clock signal CLKb corresponds to a "second clock signal".

<<<<Adjustment Circuit 54>>>>

Figure 8:
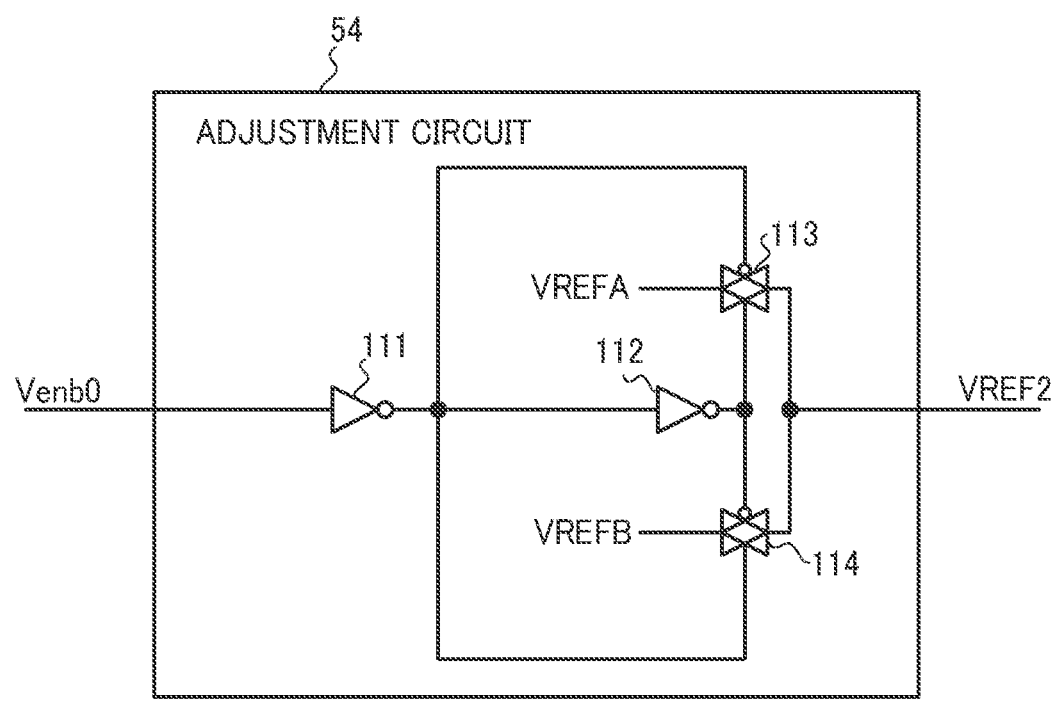
FIG. 8 is a diagram illustrating an example of an adjustment circuit 54.

FIG. 8 is a diagram illustrating an example of the adjustment circuit 54. The adjustment circuit 54 selects the reference voltage VREFA or VREFB and outputs as reference voltage VREF2 in response to the signal Venb0. Specifically, the adjustment circuit 54 includes inverters 111 and 112, and transmission gates 113 and 114. The adjustment circuit 54 outputs the reference voltage VREFA as the reference voltage VREF2 in response to the signal Venb0 being high, and outputs the reference voltage VREFB as the reference voltage VREF2 in response to the signal Venb0 being low.

Herein, the reference voltage VREFA is a reference voltage used when the AC-DC converter 10 generates the output voltage Vout of the target level from the AC voltage Vac, and the reference voltage VREFB is a reference voltage used when the AC-DC converter 10 generates the output voltage Vout of a predetermined level lower than the target level, from the AC voltage Vac. Note that the reference voltage VREFA corresponds to a "first voltage", and the reference voltage VREFB corresponds to a "second voltage".

<<<<Interruption Detection Circuit 55 and Discharge Circuit 56>>>>

Figure 9:
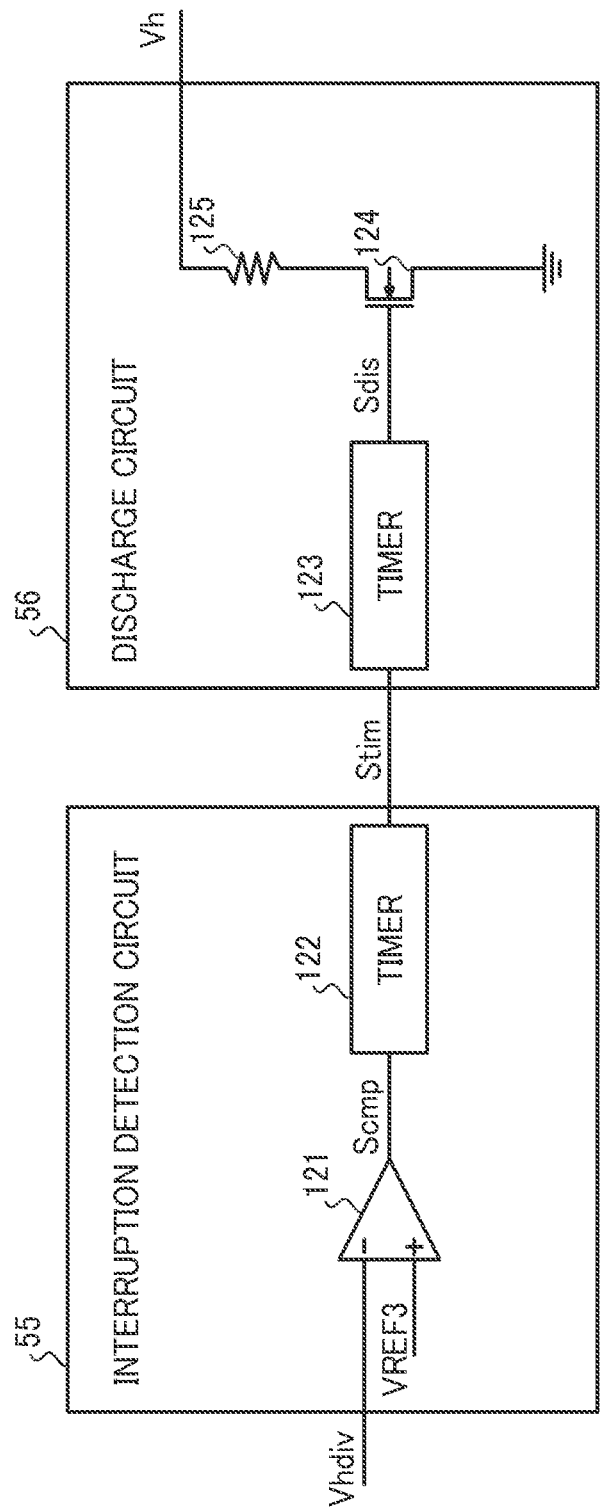
FIG. 9 is a diagram illustrating examples of an interruption detection circuit 55 and a discharge circuit 56.

With reference to FIG. 9, examples of the interruption detection circuit 55 and the discharge circuit 56 will be described.

The interruption detection circuit 55 detects whether the AC voltage Vac is being supplied, in other words, whether the AC voltage Vac is interrupted, based on the divided voltage Vhdiv. The interruption detection circuit includes a comparator 121 and a timer 122. The comparator 121 detects whether the divided voltage Vhdiv exceeds a reference voltage VREF3.

Figure 10:
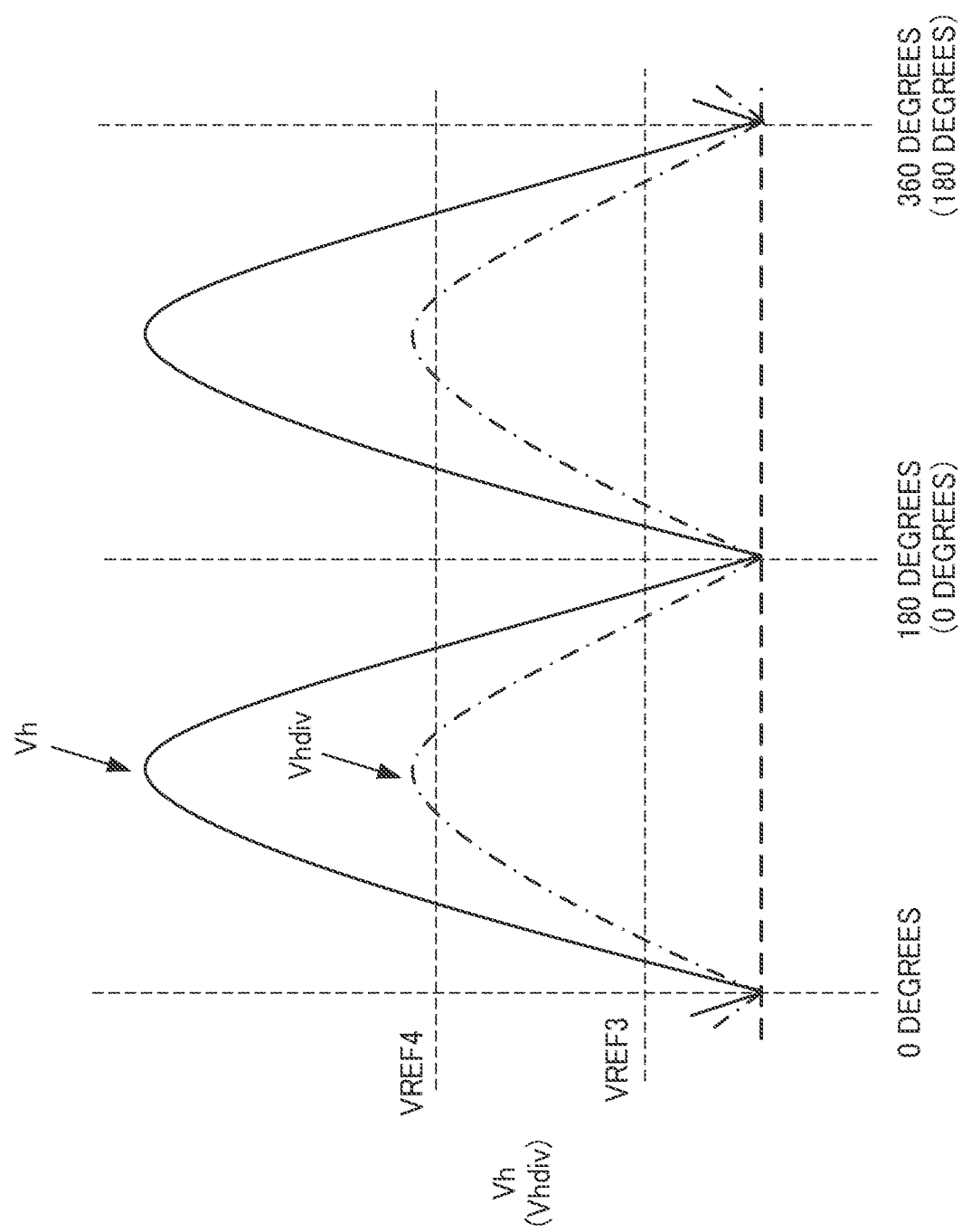
FIG. 10 is a diagram illustrating a relationship between reference voltage VREF3, reference voltage VREF4, and a divided voltage Vhdiv.

FIG. 10 illustrates a relationship between the reference voltage VREF3, a reference voltage VREF4 (described later), and the divided voltage Vhdiv. The reference voltage VREF3 used for the interruption detection circuit 55 to determine that the AC voltage Vac is not being supplied is set lower than the maximum level of the divided voltage Vhdiv in the vicinity of a phase angle of 90 degrees as illustrated in FIG. 10. Meanwhile, the reference voltage VREF3 is set higher than the low-side level of the divided voltage Vhdiv in the vicinity of phase angles of 0, 180, and 360 degrees (170 to 190 degrees when the phase angle is 180 degrees, for example) where the level of the divided voltage Vhdiv is low (substantially 0 V). In other words, the reference voltage VREF3 is set to a level between the maximum level and the low-side level, where it should be determined that the AC voltage Vac is not being supplied when the AC voltage Vac continues to be lower than the reference voltage VREF3 for a "predetermined time period T1".

Specifically, the comparator 121 compares the divided voltage Vhdiv according to the voltage at the terminal VH with the reference voltage VREF3, and outputs a signal Scmp to detect whether the AC voltage Vac is being supplied.

The timer 122 detects whether the comparator 121 continuously outputs the high signal Scmp during the "time period T1". The high signal Scmp indicates that the divided voltage Vhdiv is lower than the reference voltage VREF3. Specifically, in response to the comparator 121 outputting the high signal Scmp, the timer 122 starts measuring the "time period T1". When the "time period T1" has elapsed with the signal Scmp continuously being high, the timer 122 outputs a high pulse signal Stim to the timer 123. On the other hand, the timer 122 remains in a reset state while the AC voltage Vac is being supplied. Herein, the "time period T1" is set to determine whether the AC voltage Vac is being supplied based on the divided voltage Vhdiv. In other words, when the AC voltage Vac has not been supplied during the "time period T1", the interruption detection circuit 55 determines that the AC voltage Vac is interrupted. For example, the "time period T1" is 20 ms or longer when the frequency of the AC voltage Vac is 50 Hz.

The discharge circuit 56 discharges the capacitors 41, 43, 44, and 45 of the input line filter 20 in response to the interruption detection circuit 55 detecting that the AC voltage Vac is not being supplied. The discharge circuit includes the timer 123, an NMOS transistor 124, and a resistor 125.

The timer 123 turns on the NMOS transistor 124 during a "discharge time period D1". In response to the interruption detection circuit 55 detecting interruption of the AC voltage Vac, the timer 123 continuously outputs a high signal Sdis during the "discharge time period D1". On the other hand, in response to the interruption detection circuit 55 not detecting interruption of the AC voltage Vac, the timer 123 outputs the low signal Sdis. Herein, the "discharge time period D1" is a time period sufficient to discharge the capacitors 41, 43, 44, and 45.

The NMOS transistor 124 discharges the capacitors 41, 43, 44, and 45 of the input line filter 20. The NMOS transistor 124 is on while the timer 123 is outputting the high signal Sdis. The NMOS transistor 124 discharges the capacitors 41, 43, 44, and 45 of the input line filter 20 through the resistor 125 provided between the NMOS transistor 124 and the capacitors 41, 43, 44, and 45.

Accordingly, upon detecting that the AC voltage Vac is not being supplied based on the divided voltage Vhdiv according to the voltage at the terminal VH, the interruption detection circuit 55 and discharge circuit 56 discharge the capacitors 41, 43, 44, and 45 of the input line filter 20. Note that the capacitors 41, 43, 44, and correspond to a "third capacitor", and the NMOS transistor 124 corresponds to a "switch". The resistor 125 corresponds to a "discharge resistor". The resistance value of the voltage divider circuit 50 (i.e., the resistance value between the terminal VH and the ground) is greater than the resistance value of the resistor 125.

<<<<Signal Output Circuit 57>>>>

Returning to FIG. 3, the signal output circuit 57 will be described. The signal output circuit 57 generates a driving signal Vp1 based on the voltages Vzcd, Vfb, and Vhdiv and the signal Venb0/1 from the identification circuit 51. Specifically, in response to the effective value of the AC voltage Vac being 100 V and the signals Venb0 and Venb1 being high, the signal output circuit 57 outputs the driving signal Vp1 to drive the NMOS transistor 27. In response to the effective value of the AC voltage Vac being 200 V, and the signal Venb0 being low and the signal Venb1 being high, the signal output circuit 57 corrects the driving signal Vp1 in order to correct the input current Iin and outputs the corrected driving signal Vp1. In response to the effective value of the AC voltage Vac being 277 V and the signals Venb0 and Venb1 being low, the signal output circuit 57 corrects the driving signal Vp1 in order to correct the input current Iin and outputs the corrected driving signal Vp1.

The signal output circuit 57 includes a correction circuit 71 and a driving signal output circuit 72. The correction circuit 71 includes a circuit according to an embodiment described later, and is enabled in response to the signal Venb0/1 from the identification circuit 51. The driving signal output circuit 72 operates in response to a signal from the correction circuit 71 and the like, and includes a circuit corresponding to the correction circuit 71.

<<<<Driver Circuit 58>>>>

The driver circuit 58 is a buffer circuit that drives the NMOS transistor 27 in response to the driving signal Vp1. Specifically, the driver circuit 58 drives the NMOS transistor 27, which has a large gate capacitance and the like, using a signal Vdr of the same logic level as that of the received signal. Further, the driver circuit 58 turns on the NMOS transistor 27 in response to the high driving signal Vp1, and turns off the NMOS transistor 27 in response to the low driving signal Vp1.

<<<<<Correction Circuit 71>>>>>

The correction circuit 71 outputs various signals and the like to the driving signal output circuit 72 (described later) in response to the divided voltage Vhdiv and signal Venb0/1. When the input current Iin needs to be corrected, in other words, when at least the signal Venb0 is low, the correction circuit 71 causes the driving signal output circuit 72 to correct the driving signal Vp1. On the other hand, when the input current Iin does not need to be corrected, in other words, when the signal Venb0 is high, the correction circuit 71 causes the driving signal output circuit 72 to stop correcting the driving signal Vp1.

<<<<<Driving Signal Output Circuit 72>>>>>

The driving signal output circuit 72 outputs the driving signal Vp1, based on the feedback voltage Vfb according to the output voltage Vout and the reference voltage VREF2 according to the target level. Specifically, when the input current Iin needs to be corrected, the driving signal output circuit 72 corrects the driving signal Vp1 in response to the signals from the correction circuit 71 and the like.

The driving signal output circuit 72 includes an on-signal output circuit 80, an off-signal output circuit 82, and a reset-dominant SR flip-flop 83. The on-signal output circuit 80 generates an on-signal Ss, and the off-signal output circuit 82 generates an off-signal Sr.

<<<<<<On-Signal Output Circuit 80>>>>>>

Figure 11:
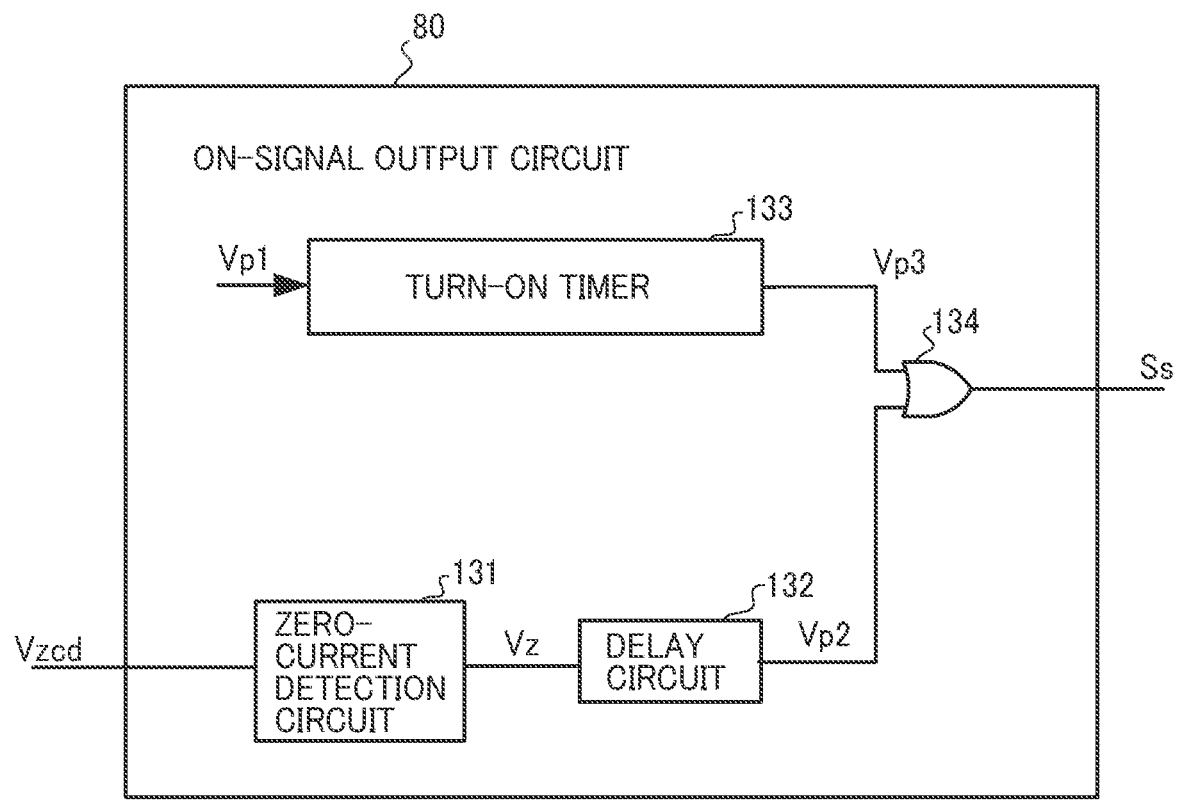
FIG. 11 is a diagram illustrating an example of an on-signal output circuit 80.

FIG. 11 is a diagram illustrating an example of the configuration of the on-signal output circuit 80. The on-signal output circuit 80 outputs the on-signal Ss to turn on the NMOS transistor 27 in response to the inductor current IL becoming substantially zero. The on-signal output circuit 80 includes a zero-current detection circuit 131, a delay circuit 132, a turn-on timer 133, and an OR circuit 134. Note that, in an embodiment of the present disclosure, the "predetermined condition" is a condition under which the inductor current IL becomes substantially zero, which will be described later.

The zero-current detection circuit 131 detects whether the current value of the inductor current IL is a "current value Ia" indicating substantially zero (hereinafter, "substantially zero" is just referred to as "zero" for convenience), in response to the voltage Vzcd at the terminal ZCD. The zero-current detection circuit 131 according to an embodiment of the present disclosure outputs a high signal Vz upon detecting that the current value of the inductor current IL is the "current value Ia" which is zero. The zero-current detection circuit 131 includes a comparator (not illustrated) that compares the voltage Vzcd with a predetermined voltage of the secondary coil L2 at a time when the inductor current IL is the "current Ia".

Upon receiving the high signal Vz from the zero-current detection circuit 131, the delay circuit 132 delays the signal Vz by a predetermined time period, and outputs the delayed signal Vz as a pulse signal Vp2.

The turn-on timer 133 outputs a pulse signal Vp3 to turn on the NMOS transistor 27, at startup of the power factor correction IC 26 or when the AC voltage Vac stops being supplied and the pulse signal Vp2 is not outputted. Specifically, in response to the pulse signal Vp2 having not been outputted for a predetermined time period, the turn-on timer 133 outputs the high pulse signal Vp3 every predetermined cycle.

The OR circuit 134 calculates the logical OR of the pulse signals Vp2 and Vp3 and outputs the resultant signal. Accordingly, in the case of the on-signal output circuit 80 illustrated in FIG. 11, the OR circuit 134 outputs the pulse signal Vp2 or Vp3 as the signal Ss.

<<<<<<Off-Signal Output Circuit 82>>>>>>

Figure 12:
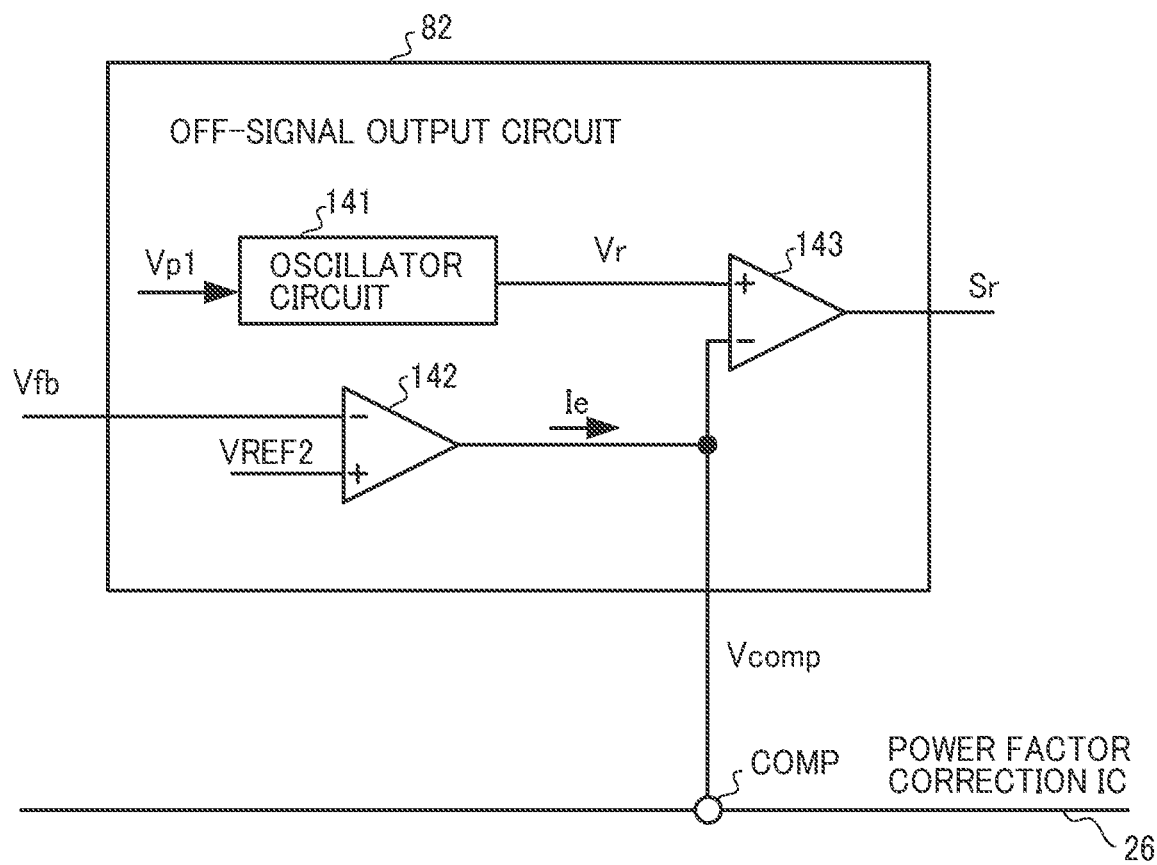
FIG. 12 is a diagram illustrating an example of an off-signal output circuit 82.

FIG. 12 is a diagram illustrating an example of the configuration of the off-signal output circuit 82. The off-signal output circuit 82 outputs the off-signal Sr based on the feedback voltage Vfb. The off-signal output circuit 82 includes an oscillator circuit 141, an error output circuit 142, and a comparator 143.

The oscillator circuit 141 outputs a ramp wave Vr upon receiving the high signal Vp1. Specifically, upon receiving the high signal Vp1, the oscillator circuit 141 outputs a ramp wave Vr whose amplitude gradually increases.

The error output circuit 142, which is a transconductance amplifier, generates an error current Ie according to an error between the feedback voltage Vfb and the reference voltage VREF2, and charges the capacitors 33 and 34 through the terminal COMP. Herein, the reference voltage VREF2 is a voltage determined according to the output voltage Vout of the target level, and is the reference voltage VREFA or VREFB selected in the adjustment circuit 54. The voltage at the terminal COMP coupled to the output of the error output circuit 142 is referred to as voltage Vcomp.

The comparator 143 is a circuit that compares the voltage Vcomp with the ramp wave Vr, and outputs the high off-signal Sr in response to the ramp wave Vr exceeding the voltage Vcomp. Specifically, the comparator 143 compares the magnitude between the voltage Vcomp and the ramp wave Vr, and outputs the off-signal Sr as a result of the comparison. Herein, the voltage Vcomp is applied to an inverting input terminal of the comparator 143, and the ramp wave Vr is applied to a non-inverting input terminal of the comparator 143. Thus, when the level of the ramp wave Vr is lower than the level of the voltage Vcomp, the off-signal Sr is low. In response to the level of the ramp wave Vr exceeding the level of the voltage Vcomp, the off-signal Sr goes high. Note that the ramp wave Vr corresponds to a "triangular-waveform oscillator voltage".

<<<<<<SR Flip-Flop 83>>>>>>

Returning to FIG. 3, the SR flip-flop 83 outputs the driving signal Vp1 in response to the on-signal Ss and off-signal Sr. The on-signal Ss is inputted to the S input of the SR flip-flop 83, and the off-signal Sr is inputted to the R input thereof. Thus, the driving signal Vp1, which is the Q output of the SR flip-flop 83, goes high in response to the signal Ss going high. On the other hand, the driving signal Vp1 goes low in response to the signal Sr going high. Further, when the signal Sr is high, the SR flip-flop 83, which is reset-dominant, outputs the low driving signal Vp1 regardless of the logic level of the signal Ss. Note that the SR flip-flop 83 corresponds to an "output circuit".

<<<<<Correction Circuit 71a>>>>>

Figure 13:
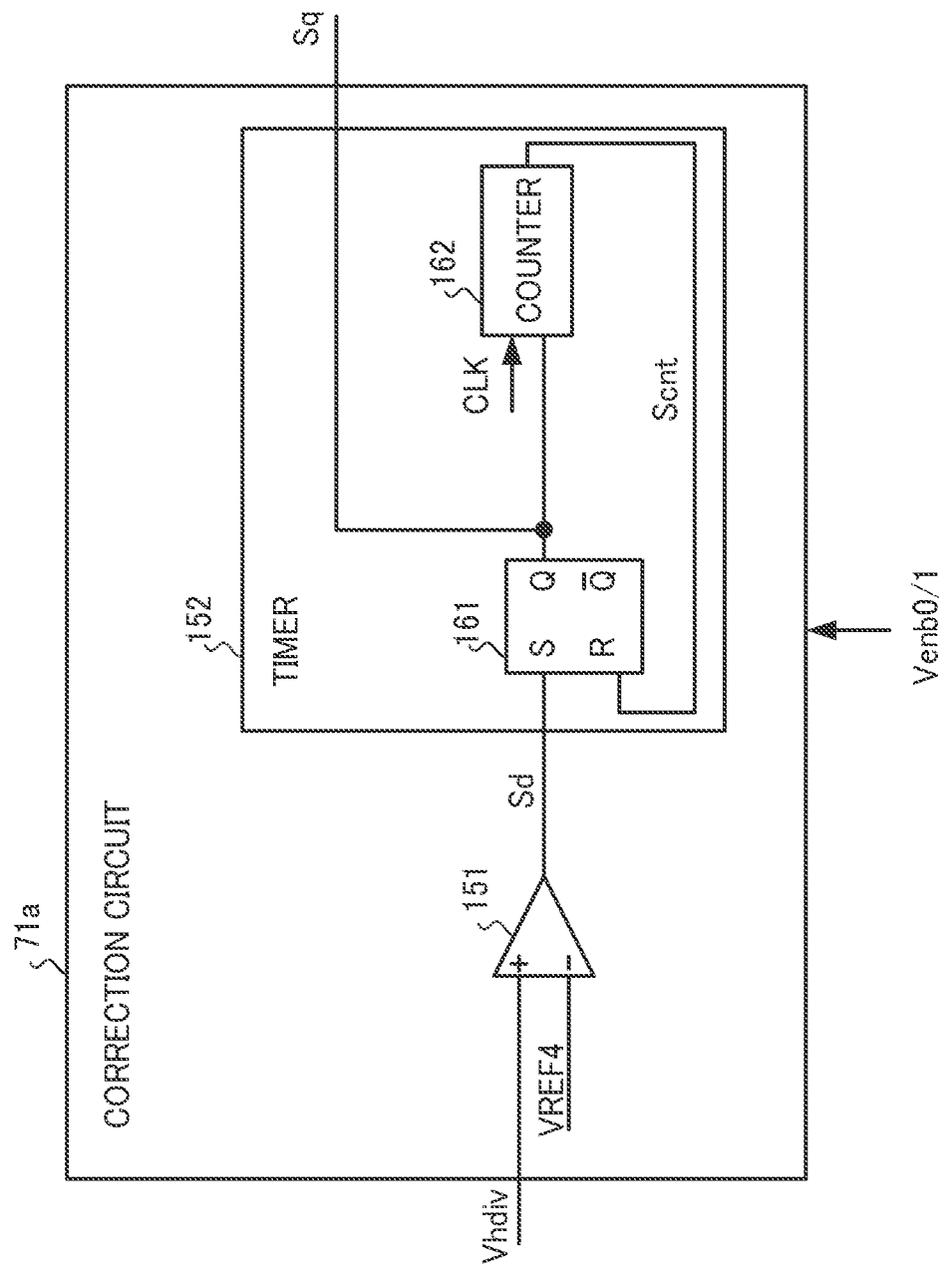

FIG. 13 is a diagram illustrating an example of a correction circuit 71a. The correction circuit 71a causes the driving signal output circuit 72 to correct the driving signal Vp1 such that the time period during which the NMOS transistor 27 is on becomes longer than the time period when the phase angle of the voltage Vh is smaller than the predetermined phase angle θ1, in response to the phase angle of the voltage Vh exceeding a predetermined phase angle θ1 (80 degrees, for example).

Specifically, when the phase angle of the voltage Vh is smaller than the predetermined phase angle θ1, the correction circuit 71a causes the driving signal output circuit 72 to output the driving signal Vp1 such that the time period during which the NMOS transistor 27 is on is a "time period P1" according to the feedback voltage Vfb. On the other hand, when the phase angle of the voltage Vh is greater than the predetermined phase angle θ1, the correction circuit 71a causes the driving signal output circuit 72 to output the driving signal Vp1 such that the time period during which the NMOS transistor 27 is on includes a "time period P2", which is longer than the "time period P1".

Note that the predetermined phase angle θ1 corresponds to a "first phase angle". The "phase angle of the voltage Vh" is given as described above, but the same applies to the "phase angle of the voltage Vhdiv".

<<<Details of Correction Circuit 71a>>>

In response to the phase angle of the voltage Vh being smaller than the phase angle θ1, the correction circuit 71a causes the driving signal output circuit 72 to output the driving signal Vp1 such that the time period during which the NMOS transistor 27 is on is the "time period P1". In response to the phase angle of the voltage Vh being greater than the phase angle θ1 and smaller than the phase angle θ2, the correction circuit 71a causes the driving signal output circuit 72 to generate the driving signal Vp1 for a "predetermined time period P0" (i.e., a time period during which the phase angle is greater than the phase angle θ1 and smaller than the phase angle θ2) such that the time period during which the NMOS transistor 27 is on includes the "time period P2", which is longer than the "time period P1". The correction circuit 71a includes a comparator 151 and a timer 152.

The comparator 151 compares the voltage Vhdiv according to the voltage at the terminal VH with the reference voltage VREF4, and outputs a detection signal Sd indicating whether the phase angle of the voltage Vh is greater than the phase angle θ1. The reference voltage VREF4 used for the comparator 151 to detect whether the phase angle of the voltage Vh is greater than the phase angle θ1 is set to the maximum level of the divided voltage Vhdiv in the vicinity of a phase angle of the voltage Vh of about 90 degrees, as illustrated in FIG. 10.

The timer 152 measures the "time period P0" in response to the detection signal Sd indicating that the voltage Vh is greater than the phase angle θ1, and outputs the signal Sq indicating that the timer 152 is measuring the time period P0. Herein, the "time period P0" is a time period from when the phase angle of the voltage Vh reaches the phase angle θ1, which is determined according to the capacitance value of the capacitor 22, to when the phase angle reaches the phase angle θ2. The phase angle θ2 is greater than the phase angle θ1 and is smaller than 180 degrees.

Specifically, in response to the divided voltage Vhdiv exceeding the reference voltage VREF4, the comparator 151 determines that the phase angle of the voltage Vh is greater than the phase angle θ1, and outputs the high detection signal Sd. On the other hand, when the divided voltage Vhdiv is lower than the reference voltage VREF4, the comparator 151 determines that the phase angle of the voltage Vh is smaller than the phase angle θ1, and outputs the low detection signal Sd.

The timer 152 includes an SR flip-flop 161 and a counter 162. The timer 152 measures the "time period P0", and outputs the high signal Sq indicating that the timer 152 is measuring the "time period P0". Specifically, in response to the phase angle of the voltage Vh being smaller than the phase angle θ1, in other words, in response to the signal Sd from the comparator 151 being low, the Q output of the SR flip-flop 161, in other words, the signal Sq is low. In response to the phase angle of the voltage Vh exceeding the phase angle θ1, in other words, in response to the detection signal Sd inputted from the comparator 151 to the S input going high, the SR flip-flop 161 outputs the high signal Sq. In response to the signal Sq going high, the counter 162 measures the "time period P0". In response to the "time period P0" having elapsed, the counter 162 outputs a high signal Scnt to the R input of the SR flip-flop 161. In response to the signal Scnt going high, the Q output of the SR flip-flop 161 goes low, and the signal Sq also goes low. On the other hand, the counter 162 is in a reset state when the signal Sq is low. Accordingly, in response to the phase angle of the voltage Vh reaching the phase angle θ1, the timer 152 outputs the high signal Sq during the "time period P0".

Herein, the "time period P0" is measured using a clock signal CLK from the switch circuit 53. The clock signal CLK is selected from CLKa and CLKb in response to the signal Vacf from the frequency identification circuit 52, which identifies whether the frequency of the AC voltage Vac is 50 or 60 Hz. When the frequency of the AC voltage Vac is 50 Hz, the timer 152 measures the "time period P0" by counting a predetermined number of times using CLKa. When the frequency of the AC voltage Vac is 60 Hz, the timer 152 measures the "time period P0" by counting a predetermined number of times using CLKb. This enables the timer 152 to measure the time period from when the phase angle reaches the phase angle θ1 to when the phase angle reaches the phase angle θ2, regardless of the frequency of the AC voltage Vac. Further, in order to measure the time period from when the phase angle reaches the phase angle θ1 to when the phase angle reaches the phase angle θ2 regardless of whether the frequency of the AC voltage Vac is 50 or 60 Hz, the number of times to be counted by the timer 152 may be changed according to the frequency of the AC voltage Vac. Note that the phase angle θ2 corresponds to a "second phase angle".

<<<Off-Signal Output Circuit 82a>>>

Figure 14:
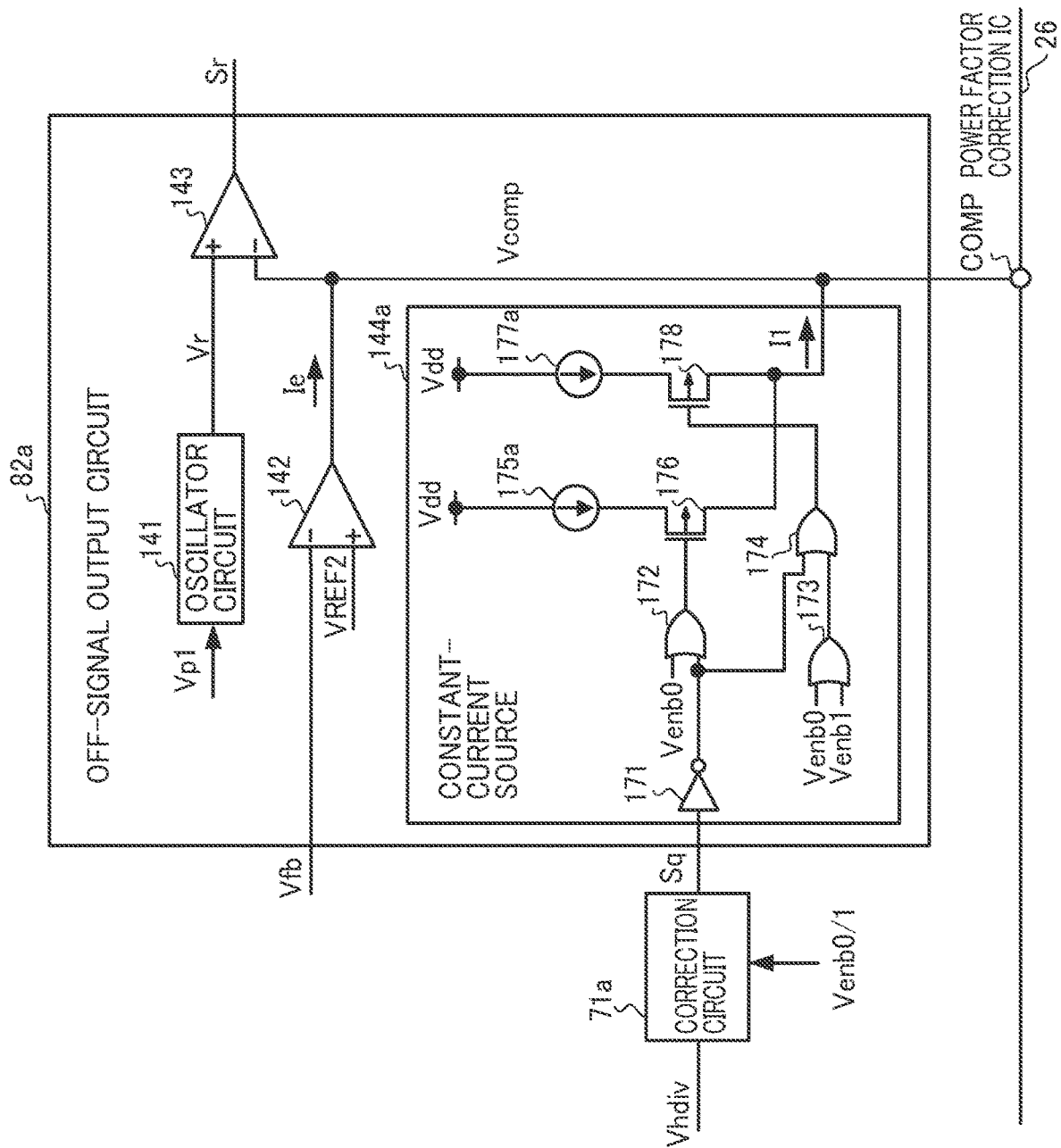

FIG. 14 is a diagram illustrating an example of an off-signal output circuit 82a. In FIG. 14, the correction circuit 71a is illustrated to explain the configuration of the off-signal output circuit 82a. The off-signal output circuit 82a generates the off-signal Sr to turn off the NMOS transistor 27. Herein, the reference voltage VREF4 is a voltage value of the divided voltage Vhdiv at a time when the phase angle of the voltage Vh is the phase angle θ1.

In response to the phase angle of the voltage Vh being smaller than the phase angle θ1, the off-signal output circuit 82a outputs the off-signal Sr such that the time period during which the NMOS transistor 27 is on is the "time period P1", based on the feedback voltage Vfb. When the "time periods P0" is being measured, the off-signal output circuit 82a outputs the off-signal Sr such that the time period during which the NMOS transistor 27 is on includes the "time period P2", based on the feedback voltage Vfb and the signal Sq of the timer 152.

The off-signal output circuit 82*a* further includes, in addition to the off-signal output circuit 82, a current source 144*a* that charges the capacitors 33 and 34 with a predetermined current I1 through the terminal COMP.

The current source 144*a* charges the capacitors 33 and with the predetermined current I1, in response to the signal Sq from the timer 152 and the signal Venb0/1 from the identification circuit 51. Specifically, the current source 144*a* includes an inverter 171, OR circuits 172, 173, and 174, P-channel metal-oxide-semiconductor (PMOS) transistors 176 and 178, and current sources 175*a* and 177*a* coupled to a power supply voltage Vdd generated inside the power factor correction IC 26. The current source 144*a* charges the capacitors 33 and 34 with the predetermined current I1, when the signal Sq is high, in other words, when the counter 162 is measuring the "time period P0". Specifically, when the signal Sq is high, the output of the inverter 171 is low, and when the signal Venb0 is low, the PMOS transistor 176 is on. Further, when the output of the inverter 171 is low and the signals Venb0 and Venb1 are low, the PMOS transistor 178 is on. When the PMOS transistor 176 is on or when the PMOS transistors 176 and 178 are on, the current I1 from the current source 144*a* is outputted to the terminal COMP. On the other hand, when the signal Sq is low, in other words, when the counter 162 is not measuring the "time period P0", the output of the inverter 171 is high, and the PMOS transistors 176 and 178 are off. The current I1 from the current source 144*a* is not outputted to the terminal COMP.

In other words, when the signal Sq indicates that the "time period P0" is being measured, the current source 144*a* charges the capacitors 33 and 34 with the predetermined current I1. The resistor 32 and the capacitors 33 and 34 for phase compensation are coupled between the ground and the outputs of the error output circuit 142 and current source 144*a* through the terminal COMP. Herein, the voltage at the terminal COMP coupled to the outputs of the error output circuit 142 and the current source 144*a* is referred to as voltage Vcomp.

As has been described above, in response to the phase angle of the voltage Vh being smaller than the phase angle θ1, the off-signal output circuit 82*a* outputs the off-signal Sr such that the time period during which the NMOS transistor 27 is on is the "time period P1", based on the feedback voltage Vfb. In response to the phase angle of the voltage Vh being greater than the phase angle θ1 and the "period P0" is being measured, in other words, the phase angle of the voltage Vh being smaller than the phase angle θ2, the off-signal output circuit 82*a* outputs the off-signal Sr such that the time period during which the NMOS transistor 27 is on includes the "time period P2", based on the feedback voltage Vfb and signal Sq. Herein, the "time period P2" is longer than the "time period P1".

Note that the comparator 151 corresponds to a "first detection circuit". The timer 152 corresponds to a "first timer circuit". The error output circuit 142 corresponds to a "first charge circuit". The current source 144*a* corresponds to a "second charge circuit", and the current I1 corresponds to a "first current". The comparator 143 corresponds to a "comparator circuit". The "time period P0" corresponds to a "correction time". The "time period P0" when the frequency of the AC voltage Vac is 50 Hz corresponds to a "first time", and the "time period P0" when the frequency of the AC voltage Vac is 60 Hz corresponds to a "second time".

<<<Operation of Power Factor Correction IC 26 Using Correction Circuit 71*a*>>>

Figure 15:
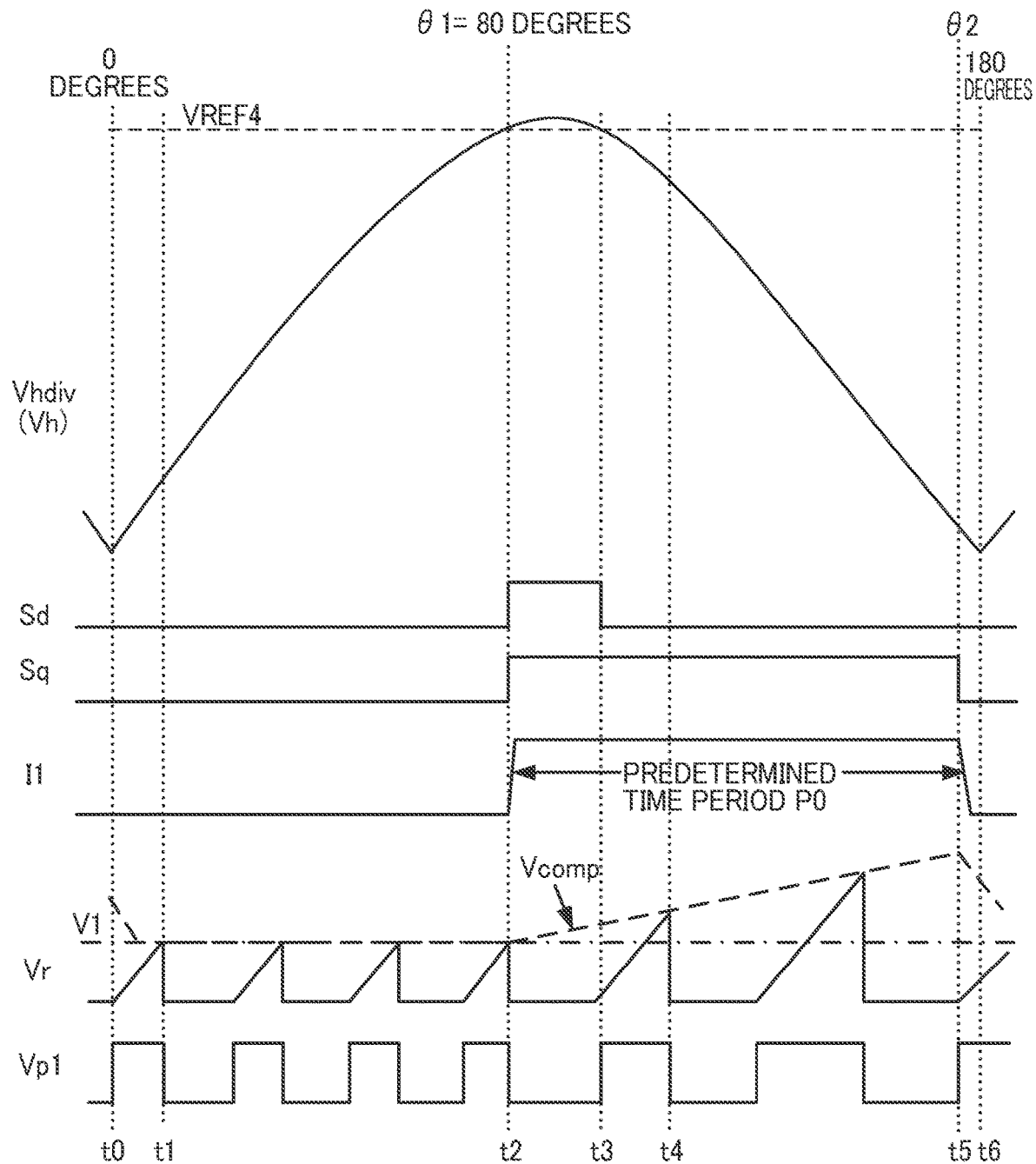

FIG. 15 is a diagram illustrating the operation of the power factor correction IC 26 using the correction circuit 71*a*.

At time t0 in FIG. 15, the phase angle of the voltage Vh is 0 degrees, and at time t6, the phase angle of the voltage Vh is 180 degrees. The driving signal Vp1 is actually a signal of several kHz, for example, and the same applies to the ramp wave Vr. However, the driving signal Vp1 and ramp wave Vr are enlarged in FIG. 15 for easy understanding of the switching operation.

Before time t2 (described later), the phase angle of the voltage Vh is smaller than the phase angle θ1, and the comparator 151 is outputting the low detection signal Sd. Accordingly, the timer 152 is outputting the low signal Sq.

From time t0 to before time t1, the signal Sq is low, and thus the current source 144*a* does not output the current I1. On the other hand, the error output circuit 142 outputs the error current Ie to generate the voltage Vcomp. The voltage Vcomp obtained by charging with the current I1 in a previous half wave of the voltage Vh gradually decreases to a voltage V1 with discharging. The voltage V1 represents a voltage value of the voltage Vcomp when the load 11 is stable and the output voltage Vout is of the target level.

At time t0, the inductor current IL reaches zero, the on-signal output circuit 80 outputs the high on-signal Ss, and thus the SR flip-flop 83 outputs the high signal Vp1. This causes the driver circuit 58 to output a high signal OUT, to thereby turn on the NMOS transistor 27. And, the oscillator circuit 141 outputs the ramp wave Vr.

When the ramp wave Vr exceeds the voltage Vcomp, which is generated with the error current Ie of the error output circuit 142, at time t1, the comparator 143 outputs the high off-signal Sr. In response to the off-signal Sr going high, the SR flip-flop 83 outputs the low signal Vp1. This causes the driver circuit 58 to output the low signal OUT, to thereby turn off the NMOS transistor 27. Note that the time period from time t0 to time t1 corresponds to the "time period P1". A similar operation is repeated from time t1 to time t2.

When the phase angle of the voltage Vh exceeds the phase angle θ1 at time t2, the voltage Vhdiv exceeds the reference voltage VREF4, and the comparator 151 outputs the high signal Sd. In response to the comparator 151 outputting the high signal Sd, the SR flip-flop 161 outputs the high signal Sq, and the counter 162 starts measuring the "time period P0". In response to the SR flip-flop 161 outputting the high signal Sq, the current source 144*a* outputs the current I1. With the current I1 from the current source 144*a*, the voltage Vcomp gradually increases.

At time t3, the inductor current IL reaches zero, the on-signal output circuit 80 outputs the high on-signal Ss, and thus the SR flip-flop 83 outputs the high signal Vp1. This causes the driver circuit 58 to output the high signal OUT, to thereby turn on the NMOS transistor 27. And, the oscillator circuit 141 outputs the ramp wave Vr. In response to the voltage Vhdiv dropping below the reference voltage VREF4, the comparator 151 outputs the low signal Sd. However, the R input of the SR flip-flop 161 has not received the high signal Scnt yet, and the SR flip-flop 161 continues to output the high signal Sq. Thus, the current source 144*a* continues to output the current I1.

In response to the ramp wave Vr exceeding the voltage Vcomp, which is generated with the error current Ie of the error output circuit 142, at time t4, the comparator 143 outputs the high off-signal Sr. In response to the off-signal Sr going high, the SR flip-flop 83 outputs the low signal Vp1. This causes the driver circuit 58 to output the low signal OUT, to thereby turn off the NMOS transistor 27. Note that the time period from time t3 to time t4 corresponds to the "time period P2". Herein, the driving signal Vp1 is generated during the "time period P0" such that the NMOS transistor 27 is on during a time period including the "time period P2", which is longer than the "time period P1". A similar operation is repeated from time t4 to time t5.

In response to the inductor current IL reaching zero at time t5, the on-signal output circuit 81 outputs the high on-signal Ss, and the SR flip-flop 83 outputs the high signal Vp1. This causes the driver circuit 58 to output the high signal OUT, to thereby turn on the NMOS transistor 27. And the oscillator circuit 141 outputs the ramp wave Vr. At time t5, at which the "time period P0" has elapsed since time t2, the counter 162 outputs the high signal Scnt, and the SR flip-flop 161 is reset. This results in the signal Sq going low, and the current source 144a stops outputting the current I1. And the operation from time t0 to time t6 is repeated.

The "time period P0" is a time period after when the phase angle of the voltage Vh reaches the phase angle θ1, which is determined according to the capacitance value of the capacitor 22, to when the phase angle reaches the phase angle θ2. The phase angle θ2 is greater than the phase angle θ1, and smaller than 180 degrees.

As has been described above, in the "time period P0", the voltage Vcomp gradually increases, and thus the off-signal Sr outputted in response to the ramp wave Vr exceeding the voltage Vcomp is delayed with respect to the on-signal Ss that is outputted to turn on the NMOS transistor 27. This gradually increases the time period during which the signal Vp1 is high, thereby gradually increasing the time period during which the NMOS transistor 27 is on.

<<<Effects of Power Factor Correction IC 26 Using Correction Circuit 71a>>>

Figure 16:
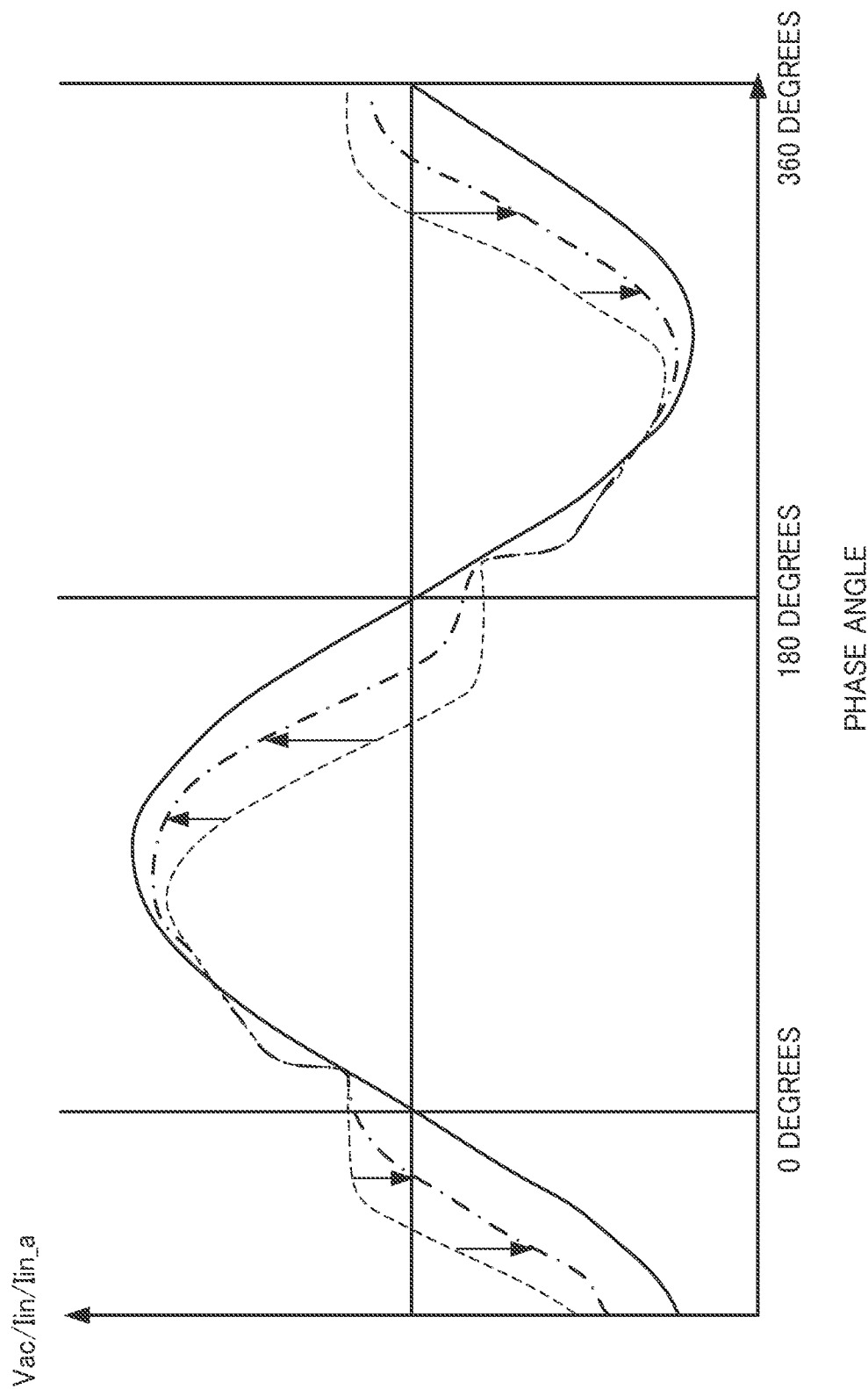

FIG. 16 is a diagram illustrating the relationship between the AC voltage Vac and input currents Iin and Iin_a in the case of using the power factor correction IC 26 that includes the correction circuit 71a. The solid line represents the waveform of the AC voltage Vac, the dotted line represents the waveform of the input current Iin without using the correction circuit 71a, and the dashed-dotted line represents the waveform of the input current Iin_a using the correction circuit 71a.

When the phase angle of the voltage Vh is in a predetermined range X (0 to 30 degrees, for example), the current for charging the discharged capacitor 22 flows as the input current Iin. Thus, the large input current Iin flows in the range X, and the input current Iin decreases when the phase angle of the voltage Vh increases to be out of the range X, which deforms the waveform thereof. This can cause degradation of the power factor.

Meanwhile, the input current Iin_a flows more than the input current Iin, with increase in the time period during which the NMOS transistor 27 is on, while the "time period P0" is being measured, in other words, while the phase angle of the voltage Vh is in the range from θ1 to θ2. Accordingly, with the use of the correction circuit 71a, the input current Iin_a is less deformed than the input current Iin, to thereby improve the power factor. The phase angle θ1 may be any angle in a range from 30 to 180 degrees.

<<<<Correction Circuit 71b>>>>>

Figure 17:
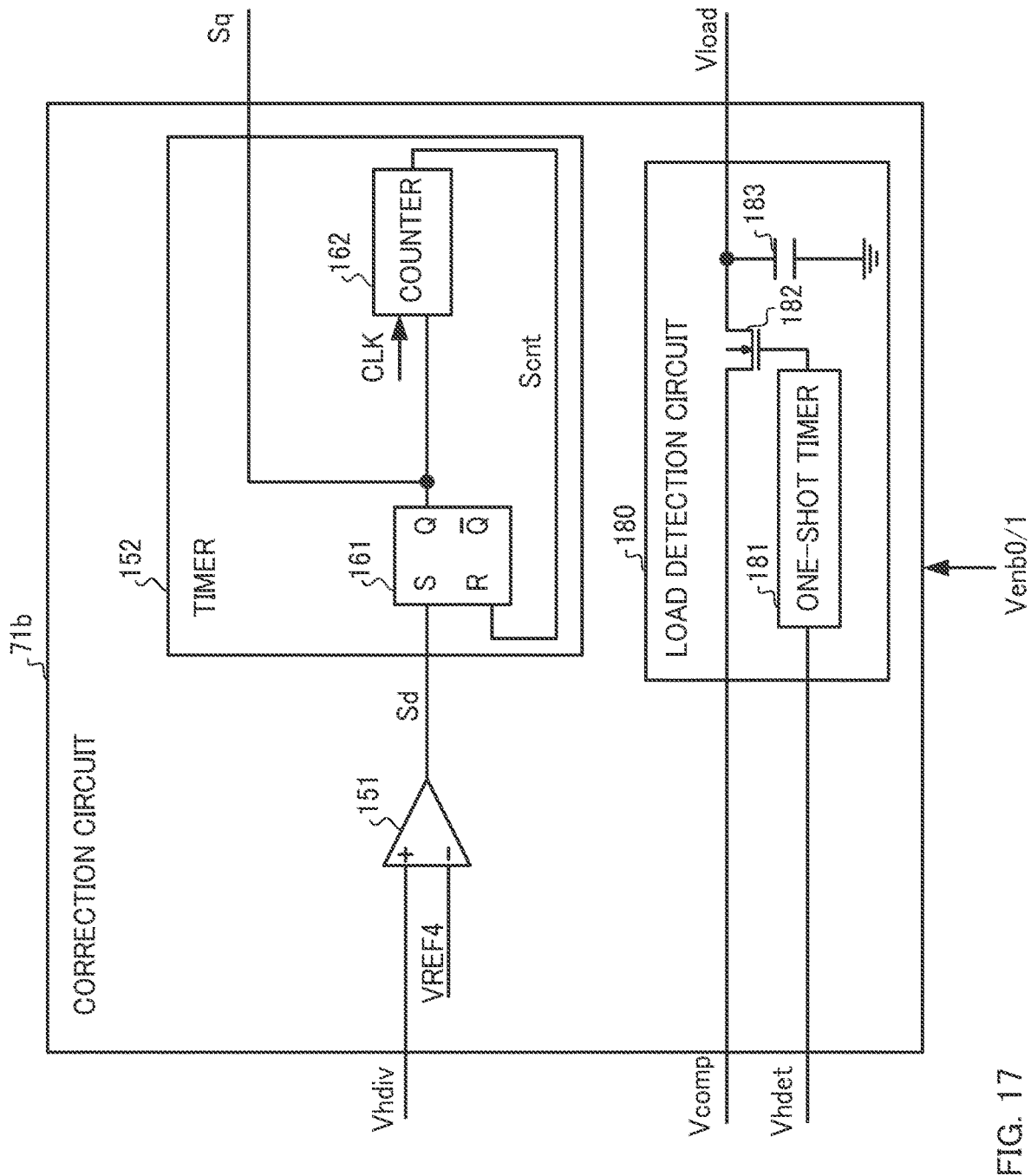
FIG. 17 is a diagram illustrating an example of a correction circuit 71b.

FIG. 17 is a diagram illustrating an example of a correction circuit 71b. The correction circuit 71b is obtained by adding a load detection circuit 180 to the correction circuit 71a. The load detection circuit 180 includes a one-shot timer 181, an NMOS transistor 182, and a capacitor 183. The load detection circuit 180 samples and holds the voltage Vcomp, with pulses based on the signal Vhdet from the identification circuit 51, to detect a load based on the voltage Vcomp.

Specifically, in response to a pulse from the one-shot timer 181 being inputted to the gate electrode of the NMOS transistor 182, the load detection circuit 180 charges the capacitor 183 with current corresponding to the voltage Vcomp. The correction circuit 71b outputs the voltage of the capacitor 183 as a voltage Vload. Herein, the one-shot timer 181 generates a pulse at each rising edge of the signal Vhdet.

<<<Off-signal Output Circuit 82b>>>

Figure 18:
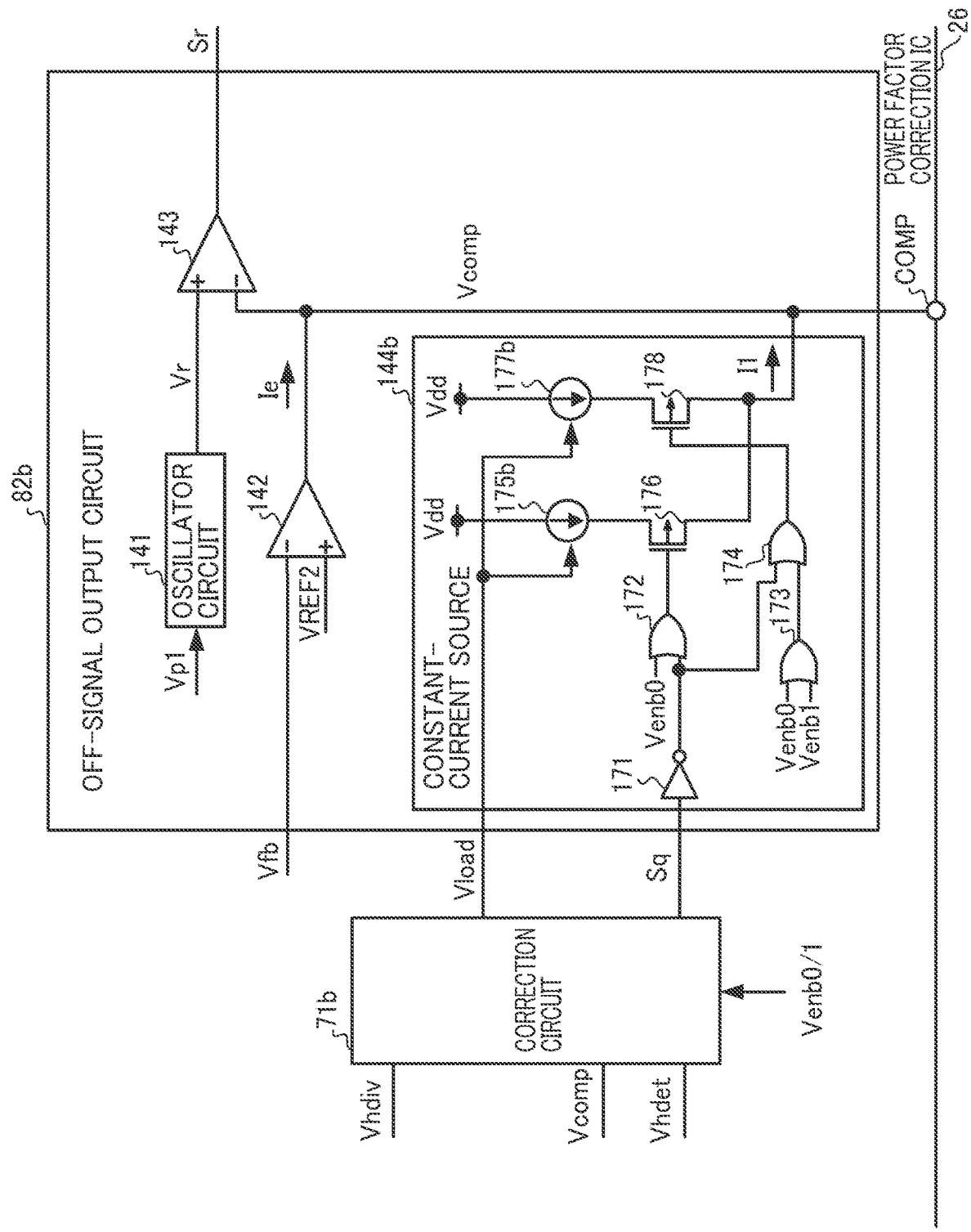
FIG. 18 is a diagram illustrating an example of an off-signal output circuit 82b.

FIG. 18 is a diagram illustrating an example of an off-signal output circuit 82b. The off-signal output circuit 82b is obtained by adding a current source 144b in place of the current source 144a to the off-signal output circuit 82a. The current source 144b includes current sources 175b and 177b that supply current so as to alter the current I1 according to the voltage Vload. Specifically, the current source 144b increases the current I1 such that the input current Iin increase as the load 11 of the AC-DC converter 10 transitioning to a light load state. This results in further rise in the voltage Vcomp, to thereby delay outputting of the off-signal Sr. This increase the time period during which the driving signal Vp1 is high, to thereby increase the input current Iin.

This restrains the input current Iin from decreasing due to a decrease in the difference between the AC voltage Vac and the output voltage Vout which rises as the load 11 transitions to the light load state, and appropriately alters the input current Iin, thereby being able to improve the power factor.

<<<<<Correction Circuit 71c>>>>>

Figure 19:
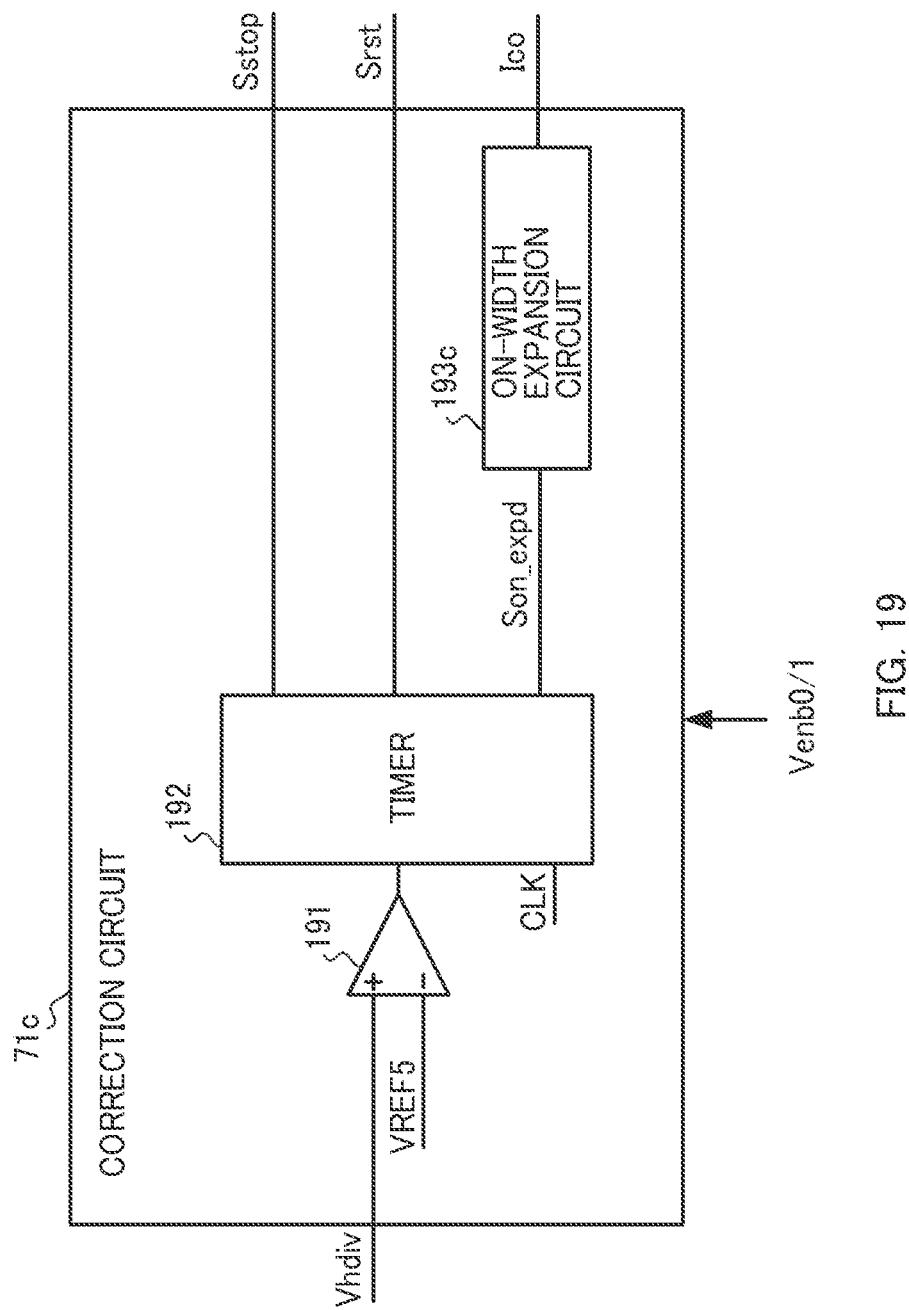
FIG. 19 is a diagram illustrating an example of a correction circuit 71c.

FIG. 19 is a diagram illustrating an example of a correction circuit 71c. The correction circuit 71c causes the driving signal output circuit 72 to correct the driving signal Vp1 according to the phase angle of the AC voltage Vac. Specifically, the correction circuit 71c causes the driving signal output circuit 72 to output the driving signal Vp1 to turn off the NMOS transistor 27, while the phase angle of the AC voltage Vac changes from a predetermined phase angle θa to θb. After the phase angle reaches the phase angle θb, the correction circuit 71c causes the driving signal output circuit 72 to output the driving signal Vp1.

After the phase angle reaches the phase angle θb, until the phase angle reaches a phase angle θc, the correction circuit 71c causes the driving signal output circuit 72 to output the driving signal Vp1, such that the NMOS transistor 27 is turned on in response to the predetermined condition being satisfied and the time period during which the NMOS transistor 27 is off is a predetermined time period. Then, after the phase angle reaches the phase angle θc, until the phase angle reaches the phase angle θd, the correction circuit 71c causes the driving signal output circuit 72 to correct the driving signal Vp1 such that the time period during which the NMOS transistor 27 is on is longer than the time period at least during which the phase angle changes from the phase angle θb to θc.

<<<Details of Correction Circuit 71c>>>

The correction circuit 71c includes a comparator 191, a timer 192, and an on-width expansion circuit 193c. The comparator 191 compares the voltage Vhdiv with a reference voltage VREF5, to detect that the phase angle of the AC voltage Vac is the phase angle θa. In response to the result of detection by the comparator 191, the timer 192 counts with the clock signal CLK from the switch circuit 53 to determine the timings at which the phase angle reaches the phase angles θa, θb, θc, and θd. Accordingly, by counting with the clock signal CLK, the timings at which the phase angle reaches the phase angles θa, θb, θc, and θd are determined, regardless of whether the frequency of the AC voltage Vac is 50 or 60 Hz. The timer 192 outputs a high signal Sstop while the phase angle changes from the phase angle θa to θb, outputs a high signal Srst while the phase angle changes from the phase angle θb to θc, and outputs a high signal Son_expd while the phase angle changes from the phase angle θc to θd.

Although the details will be described later, when the signal Son_expd is outputted, the on-width expansion circuit 193c controls the oscillator circuit 141 such that the time period during which the NMOS transistor 27 is on is longer than the time period at least during which the phase angle changes from the phase angle θb to θc.

Meanwhile, although the details will be described later, the correction circuit 71c causes an off-signal output circuit 82c to output the high off-signal Sr, in response to the signal Sstop going high. Further, the correction circuit 71c causes the on-signal output circuit 81 (described later) and the off-signal output circuit 82c (described later) to operate so as to generate the driving signal Vp1 such that the time period during which the NMOS transistor 27 is off is a predetermined time period, in response to the high signal Srst going high.

Note that the comparator 191 corresponds to a "second detection circuit", and the timer 192 corresponds to a "second timer circuit". The phase angles θa, θb, θc, and θd correspond to a "third phase angle", a "fourth phase angle", a "fifth phase angle", and a "sixth phase angle", respectively. The timings at which the phase angle reaches the phase angles θa, θb, θc, and θd correspond to a "first timing", a "second timing", a "third timing", and a "fourth timing", respectively.

<<<On-Signal Output Circuit 81>>>

Figure 20:
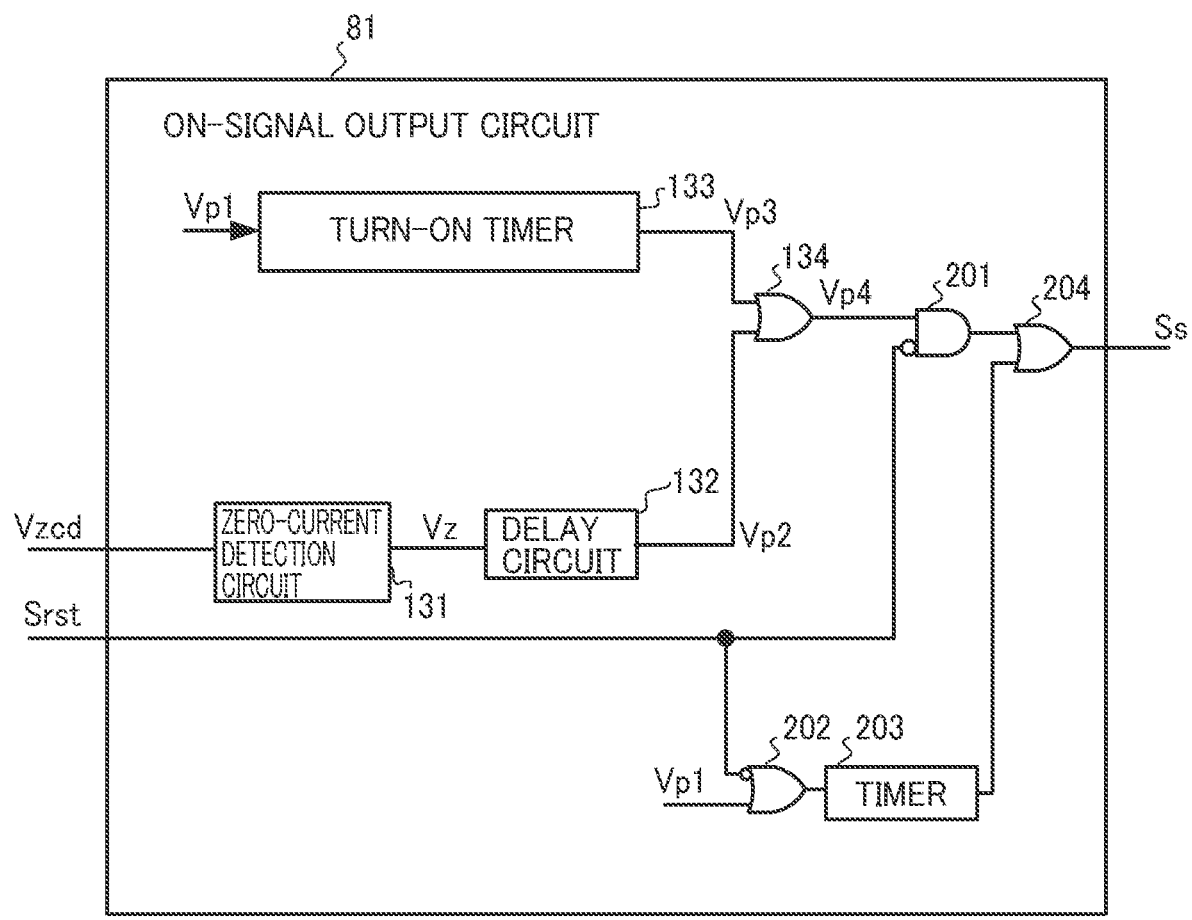
FIG. 20 is a diagram illustrating an example of an on-signal output circuit 81.

FIG. 20 is a diagram illustrating an example of the on-signal output circuit 81. The on-signal output circuit is obtained by adding, to the on-signal output circuit 80, a circuit that disables an output signal Vp4 of the OR circuit 134 in the on-signal output circuit 80 upon receiving the high signal Srst. Specifically, the on-signal output circuit 81 includes the on-signal output circuit 80, an AND circuit 201, OR circuits 202 ad 204, and a timer 203.

In the on-signal output circuit 81, the signal Vp4 is generated in the same manner as in the on-signal output circuit 80. However, in response to the signal Srst being high, the signal Vp4 is disabled by the AND circuit 201. On the other hand, in response to the signal Vp1 going low when the signal Srst is high, the timer 203 measures a time such that the time period during which the NMOS transistor is off is a predetermined time period, and outputs a high signal. This causes the signal Ss to go high, to thereby turn on the NMOS transistor 27. In response to the signal Vp1 going high when the signal Srst is high, the timer 203 is reset.

Further, in response to the signal Srst being low, the timer 203 is reset and outputs a low signal. Accordingly, in response to the signal Srst being low, the on-signal output circuit 81 operates similarly to the on-signal output circuit 80.

Note that the AND circuit 201, OR circuits 202 and 204, and timer 203 correspond to a part of a "control circuit".

<<<Off-Signal Output Circuit 82c>>>

Figure 21:
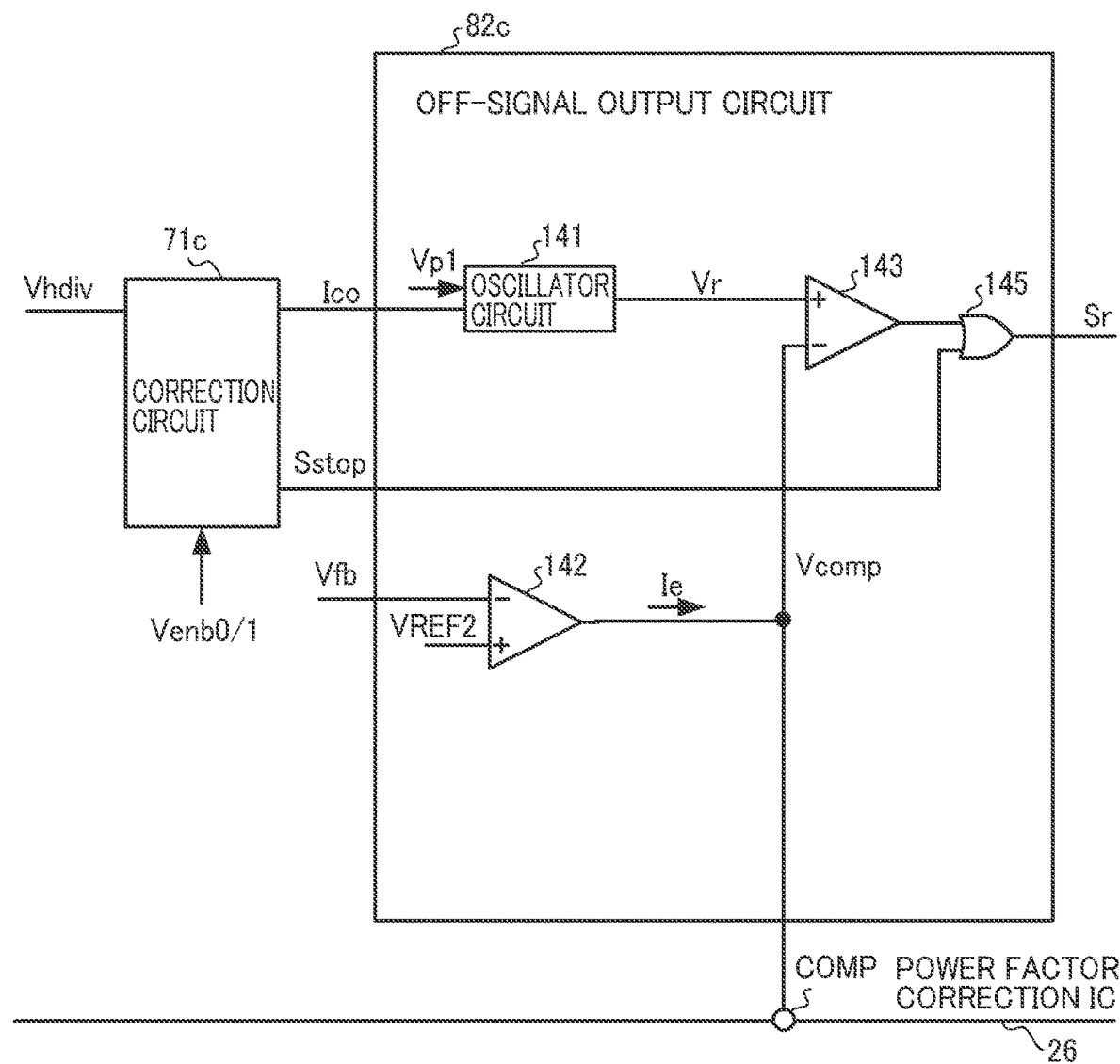
FIG. 21 is a diagram illustrating an example of an off-signal output circuit 82c.

FIG. 21 is a diagram illustrating an example of the off-signal output circuit 82c. In FIG. 21, the correction circuit 71c is illustrated for explaining the configuration of the off-signal output circuit 82c. The off-signal output circuit 82c is configured to control the oscillator circuit 141 of the off-signal output circuit 82 with the current Ico from the correction circuit 71c. The off-signal output circuit 82c further includes an OR circuit 145 that causes the off-signal Sr to be high in response to the signal Sstop being high.

In response to the signal Sstop goes high, the OR circuit 145 outputs the high off-signal Sr. At this time, the SR flip-flop 83, which is reset-dominant, outputs the low driving signal Vp1, to thereby turn off the NMOS transistor 27.

In response to the signal Sstop being low and the signal Son_expd being high, the oscillator circuit 141 is controlled with the current Ico, which will be described later in detail. Thus, the ramp wave Vr has a slope smaller than the slope when the signal Srst is high, which delays outputting of the signal Sr after the predetermined condition is satisfied, to thereby increase the time period during which the NMOS transistor 27 is on.

When the signal Sstop is low and the signal Son_expd is low and thus the oscillator circuit 141 is not controlled with the current Ico, the off-signal Sr is outputted based on the feedback Vfb. Note that the OR circuit 145 corresponds to a part of the "control circuit".

<<<<Control of Oscillator Circuit 141 by On-Width Expansion Circuit 193c>>>>

Figure 22:
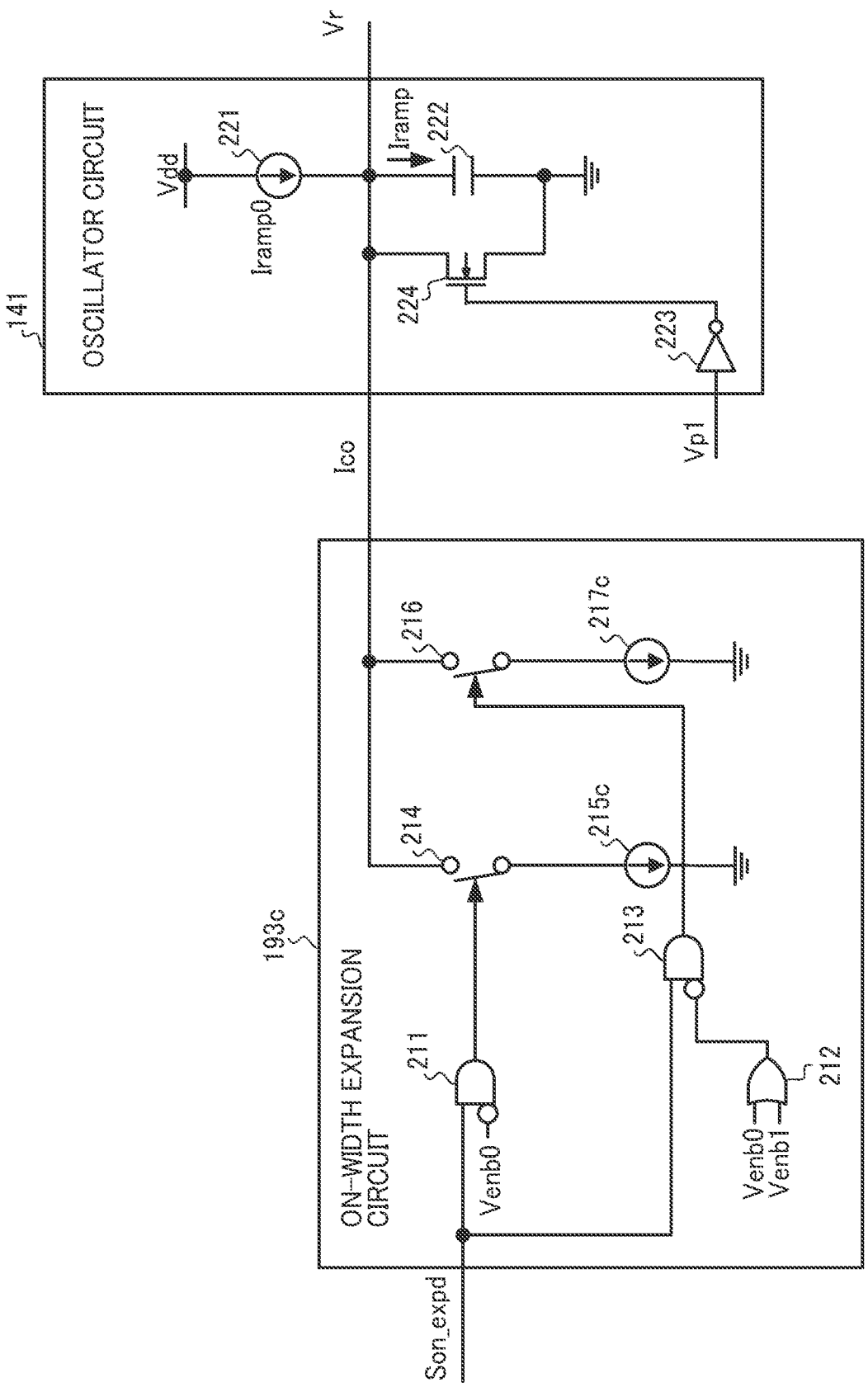
FIG. 22 is a diagram illustrating examples of an oscillator circuit 141 and an on-width expansion circuit 193c.

FIG. 22 is a diagram illustrating examples of the oscillator circuit 141 and on-width expansion circuit 193c. The oscillator circuit 141 outputs the ramp wave Vr in response to the NMOS transistor 27 being turned on, that is, the signal Vp1 going high. In response to the signal Son_expd going high, the on-width expansion circuit 193c separates the current Iramp0 from a current source 221 in the oscillator circuit 141 into the ground as well, to thereby reduce the slope of the ramp wave Vr.

Prior to detailed description of the on-width expansion circuit 193c, the operation of the oscillator circuit 141 will be described. The oscillator circuit 141 includes the current source 221, a capacitor 222, an inverter 223, and an NMOS transistor 224. In response to the signal Vp1 being high, the oscillator circuit 141 charges the capacitor 222 with the current Iramp according to the current Iramp0 from the current source 221. The oscillator circuit 141 then outputs the voltage in the capacitor 222 as the ramp wave Vr. Meanwhile, in response to the signal Vp1 being low, the NMOS transistor 224 is on, and the capacitor 222 is discharged, and thus the ramp wave Vr is not outputted, and the oscillator circuit 141 outputs the voltage at the ground level.

Next, the on-width expansion circuit 193c will be described. In response to the signal Son_expd being high, the on-width expansion circuit 193c separates the current Iramp0 from the current source 221 in the oscillator circuit 141, to thereby control the current Iramp. The on-width expansion circuit 193c includes AND circuits 211 and 213, the OR circuit 212, switches 214 and 216, and current sources 215c and 217c.

Specifically, in response to the signal Son_expd being high and the signal Venb0 being low, the on-width expansion circuit 193c turns on the switch 214, to thereby reduce the current Iramp by an amount of a current flowing through the current source 215c. This causes the oscillator circuit 141 to output the ramp wave Vr for increasing the time period during which the NMOS transistor 27 is on.

In response to the signal Son_expd being high and the signals Venb0 and Venb1 being low, the on-width expansion circuit 193c turns on the switch 216, to thereby further reduce the current Iramp by an amount of a current flowing through the current source 217c. In other words, the current Iramp decreases by an amount of the current Ico, according to the voltage level of the effective value of the AC voltage Vac. This causes the oscillator circuit 141 to output the ramp wave Vr for further increasing the time period during which the NMOS transistor 27 is on.

On the other hand, in response to the signal Son_expd being low, or the signals Venb0 and Venb1 being high, the switches 214 and 216 are off, and the current Iramp results in being the current Iramp0.

<<<Operation of Power Factor Correction IC 26 Using Correction Circuit 71c>>>

Figure 23:
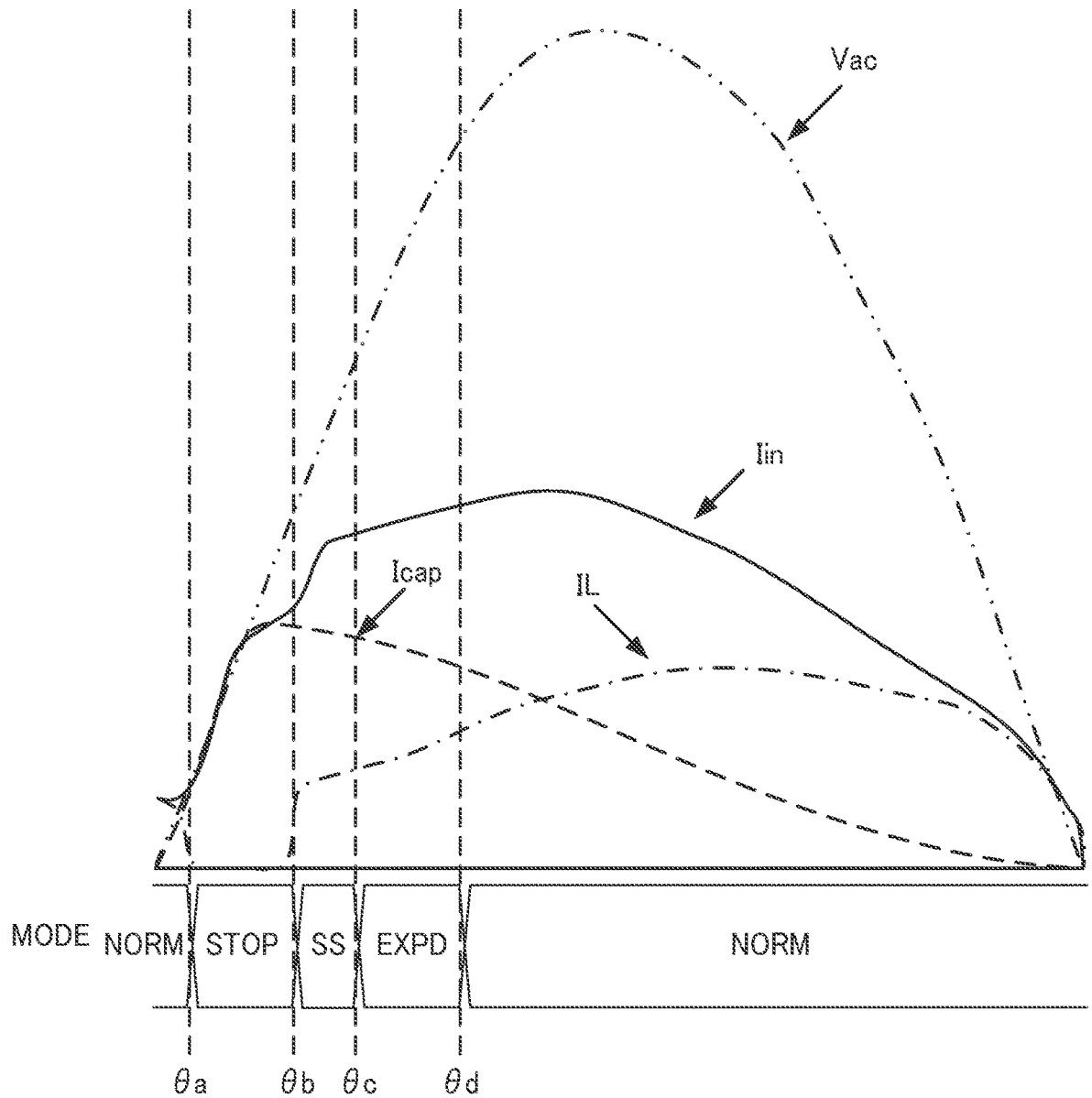
FIG. 23 is a diagram illustrating changes in Icap and changes in IL and Iin with mode transition.

FIG. 23 is a diagram illustrating the operation of the power factor correction IC 26 including the correction circuit 71c.

In response to the phase angle of the AC voltage Vac being smaller than the phase angle θa (10 degrees, for example), which is greater than 0 degrees, the correction circuit 71c causes the driving signal output circuit 72 to output the driving signal Vp1 including a "time period P3" according to the feedback voltage Vfb as the time period during which the NMOS transistor 27 is on. The mode in this case is referred to as "NORM".

In response to the phase angle reaching the phase angle θa, the comparator 191 detects that the voltage Vhdiv exceeds the reference voltage VREF5. The timer 192 measures a time at the timing at which the phase angle reaches the phase angle θa, and outputs the high signal Sstop. In response to the signal Sstop going high, the off-signal output circuit 82c outputs the high off-signal Sr. Upon receiving the high signal Sr, the SR flip-flop 83 outputs the low driving signal Vp1, to thereby stop switching the NMOS transistor 27.

In addition, in response to the phase angle reaching the phase angle θa, charge current starts flowing through the capacitor 22, and the current Icap flowing through the capacitor 22 increases. However, since the NMOS transistor 27 stops switching, the inductor current IL does not flow, and the input current Iin is corrected, resulting in substantially only charge current. The mode in which the phase angle changes from the phase angle θa to the phase angle θb is referred to as "STOP".

In response to the phase angle reaching the phase angle θb, the timer 192 causes the signal Sstop to go low and the signal Srst to go high. The on-signal output circuit 81 disables the output signal Vp4 of the OR circuit 134 in response to the signal Srst going high, and then releases the reset state of the timer 203 in response to the driving signal Vp1 going low. In response to release of the reset state of the timer 203, the timer 203 measures the time period during which the NMOS transistor 27 is off. In response to the counted time period reaching a predetermined time period, the timer 203 outputs a high signal. And, the on-signal output circuit 81 outputs the high on-signal Ss. Upon receiving the high signal Ss, the SR flip-flop 83 outputs the high driving signal Vp1.

Thereafter, the off-signal output circuit 82c outputs the high off-signal Sr according to the feedback voltage Vfb. Upon receiving the high off-signal Sr, the SR flip-flop 83 causes the driving signal Vp1 to go low. The on-signal output circuit 81 repeats such an operation while the phase angle changes from the phase angle θb to θc. This causes the driver circuit 58 to start switching the NMOS transistor 27.

In response to the phase angle reaching the phase angle θb, the current Icap decreases. Although the current Icap decreases, the inductor current IL flows, and thus the input current Iin is corrected to increase. The mode in which the phase angle changes from the phase angle θb to θc is referred to as "SS".

In response to the phase angle reaching the phase angle θc, the timer 192 causes the signal Srst to go low and the signal Son_expd to go high. In response to the signal Son_expd going high, the on-width expansion circuit 193c performs control so as to reduce the slope of the ramp wave Vr outputted from the oscillator circuit 141. This causes the off-signal output circuit 82c to output the off-signal Sr later than the timing at which the NMOS transistor 27 is turned on. Consequently, the SR flip-flop 83 outputs the driving signal Vp1 includes a "time period P4" in which the time period during which the NMOS transistor 27 is on is longer than at least the time period during which the phase angle is in a range from the phase angles θb to θc.

Further, in response to the phase angle reaching the phase angle θc, the current Icap further decreases, and the time period during which the NMOS transistor 27 is on increases, to thereby increase the inductor current IL. Thus, the input current Iin is corrected, to further increase. The mode in which the phase angle increases from the phase angle θc to θd is referred to as "EXPD".

In response to the phase angle reaching the phase angle θd, the timer 192 causes the signal Son_expd to go low. In response to the signal Son_expd going low, the on-width expansion circuit 193c stops the control for reducing the slope of the ramp wave Vr outputted from the oscillator circuit 141. Then the on-signal output circuit 81 and off-signal output circuit 82c transitions to an operation for the case where the phase angle is smaller than phase angle θa, without being controlled by the correction circuit 71c.

Further, in response to the phase angle reaching the phase angle θd, the charge current flowing through the capacitor 22 decreases below a "predetermined value Ib". Note that the "predetermined value Ib" is a current value of the charge current when the proportion of the charge current in the current Icap becomes negligibly small. The mode when the phase angle is greater than the phase angle θd is referred to as "NORM".

Note that the "time period P3" corresponds to a "first time period", and the "time period P4" corresponds to a "second time period".

<<<Change in Driving Signal Vdr with Mode Transition>>>

Figure 24:
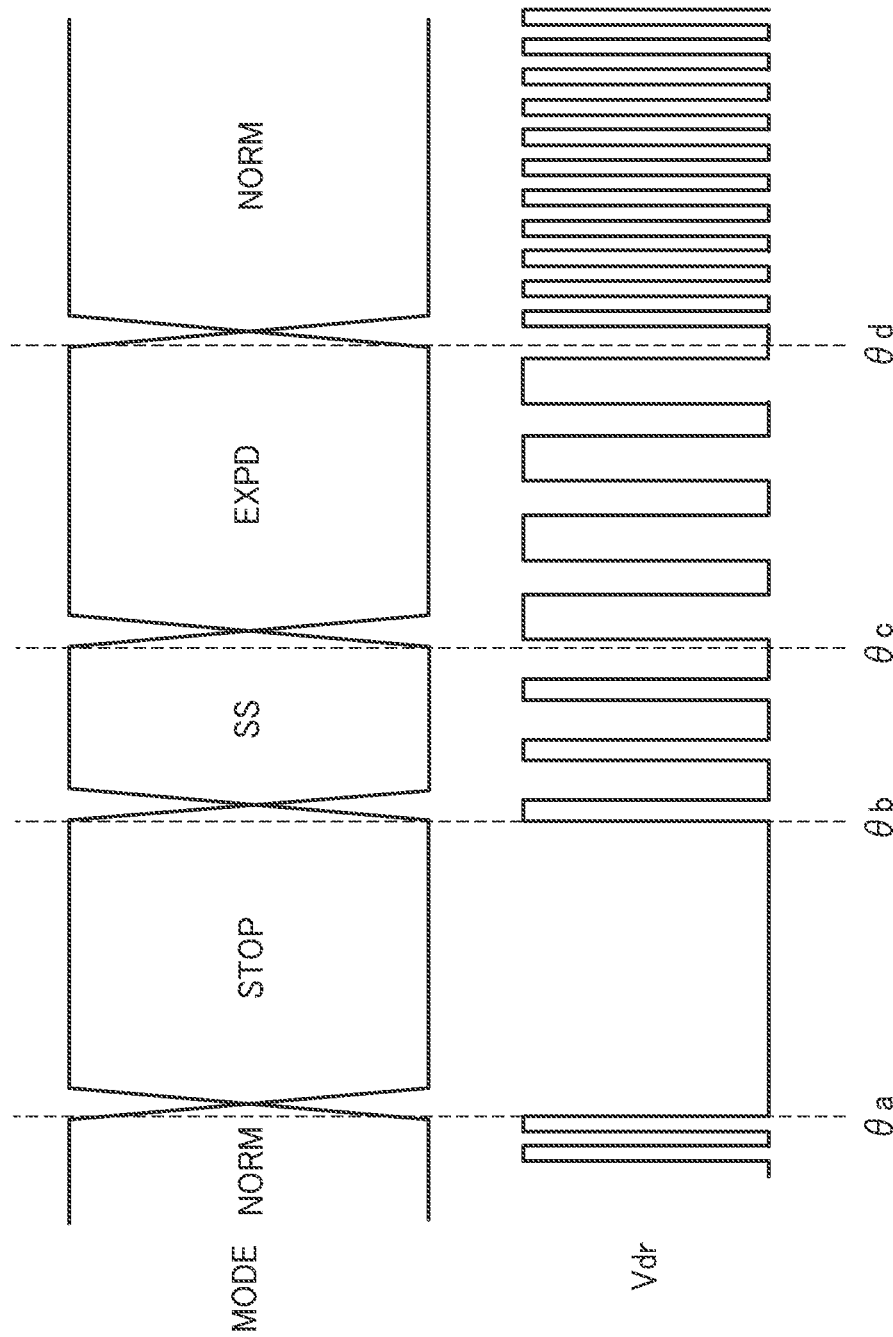
FIG. 24 is a diagram illustrating changes in a driving signal Vdr with mode transition.

FIG. 24 is a diagram illustrating changes in the driving signal Vdr with mode transition. When the mode is "NORM", the correction circuit 71c does not operate, and the driving signal Vdr is generated such that the NMOS transistor 27 be on during the "time period P3" according to the feedback voltage Vfb.

When the mode is "STOP", the timer 192 outputs the high signal Sstop. This causes the driving signal output circuit 72 to output the low signal Vp1, and the driver circuit 58 outputs the driving signal Vdry to stop switching the NMOS transistor 27.

When the mode is "SS", the timer 192 outputs the high signal Srst. Further, the on-signal output circuit 81 outputs the on-signal Ss such that the time period during which the NMOS transistor 27 is off is a predetermined time period. The off-signal output circuit 82c outputs the off-signal Sr such that the time period during which the NMOS transistor 27 is on is determined according to the feedback voltage Vfb. This causes the driving signal output circuit to generate the signal Vp1 such that the time period during which the NMOS transistor 27 is off is a predetermined time period, and the driver circuit 58 outputs the driving signal Vdry such that the time period during which the NMOS transistor 27 is off is a predetermined time period.

When the mode is "EXPD", the timer 192 outputs the high signal Son_expd. The on-signal output circuit 81 outputs the high on-signal Ss based on the voltage Vzcd. Because of the reduction in the slope of the ramp wave Vr outputted from the oscillator circuit 141 due to the current Ico from the on-width expansion circuit 193c, the off-signal output circuit 82c outputs the off-signal Sr such that the "time period P4", during which the NMOS transistor 27 is on, is longer than at least the time period in the mode "SS". This causes the driving signal output circuit 72 to generate the signal Vp1 such that the "time period P4" is longer than the "time period P3", and the driver circuit 58 outputs the driving signal Vdry so that the "time period P4" is longer than the "time period P3".

<<<<<Correction Circuit 71d>>>>>

Figure 25:
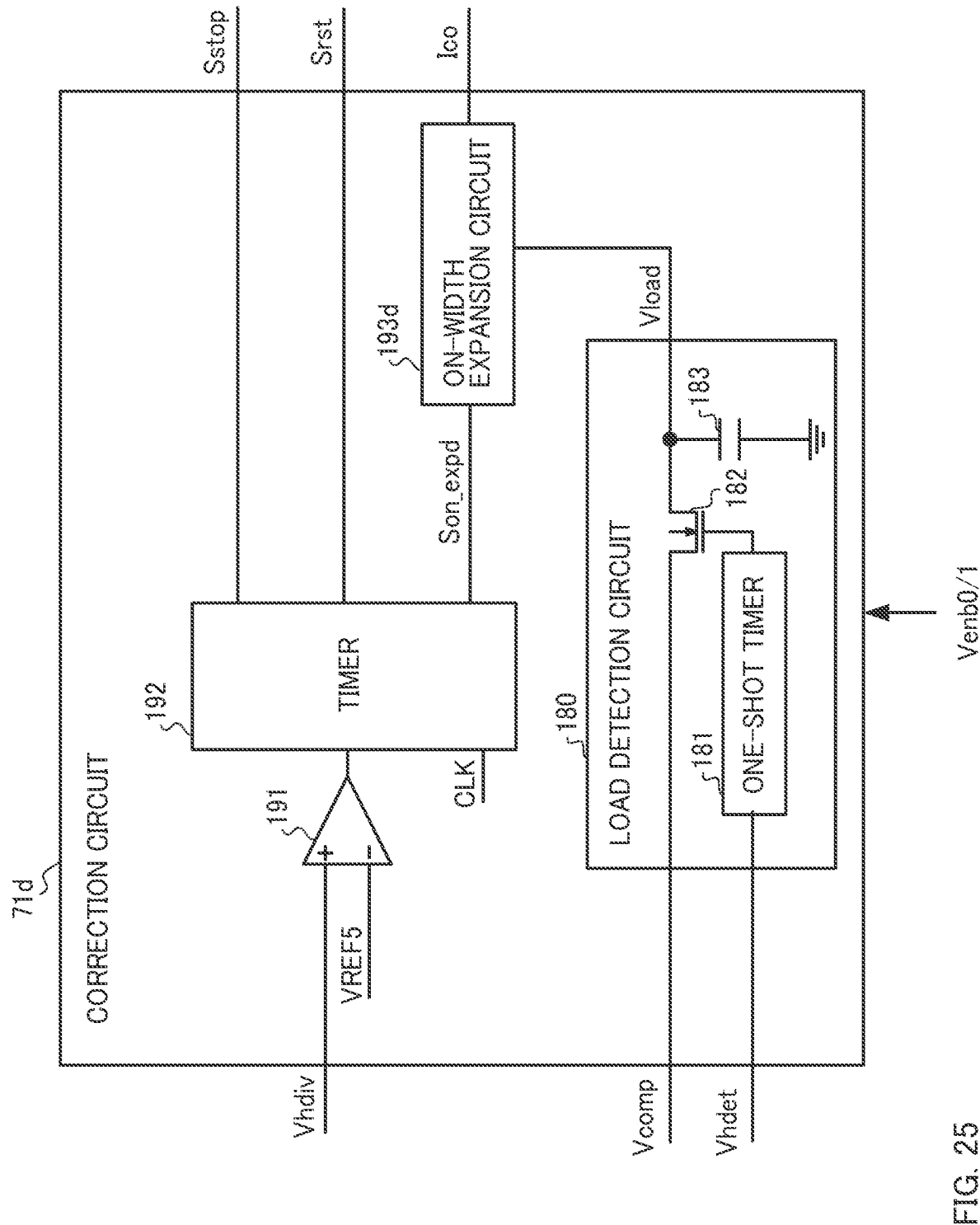
FIG. 25 is a diagram illustrating an example of a correction circuit 71d.

FIG. 25 is a diagram illustrating an example of a correction circuit 71d. The correction circuit 71d is obtained by adding the load detection circuit 180 to the correction circuit 71c.

<<<<Control of Oscillator Circuit 141 by On-Width Expansion Circuit 193d>>>>

Figure 26:
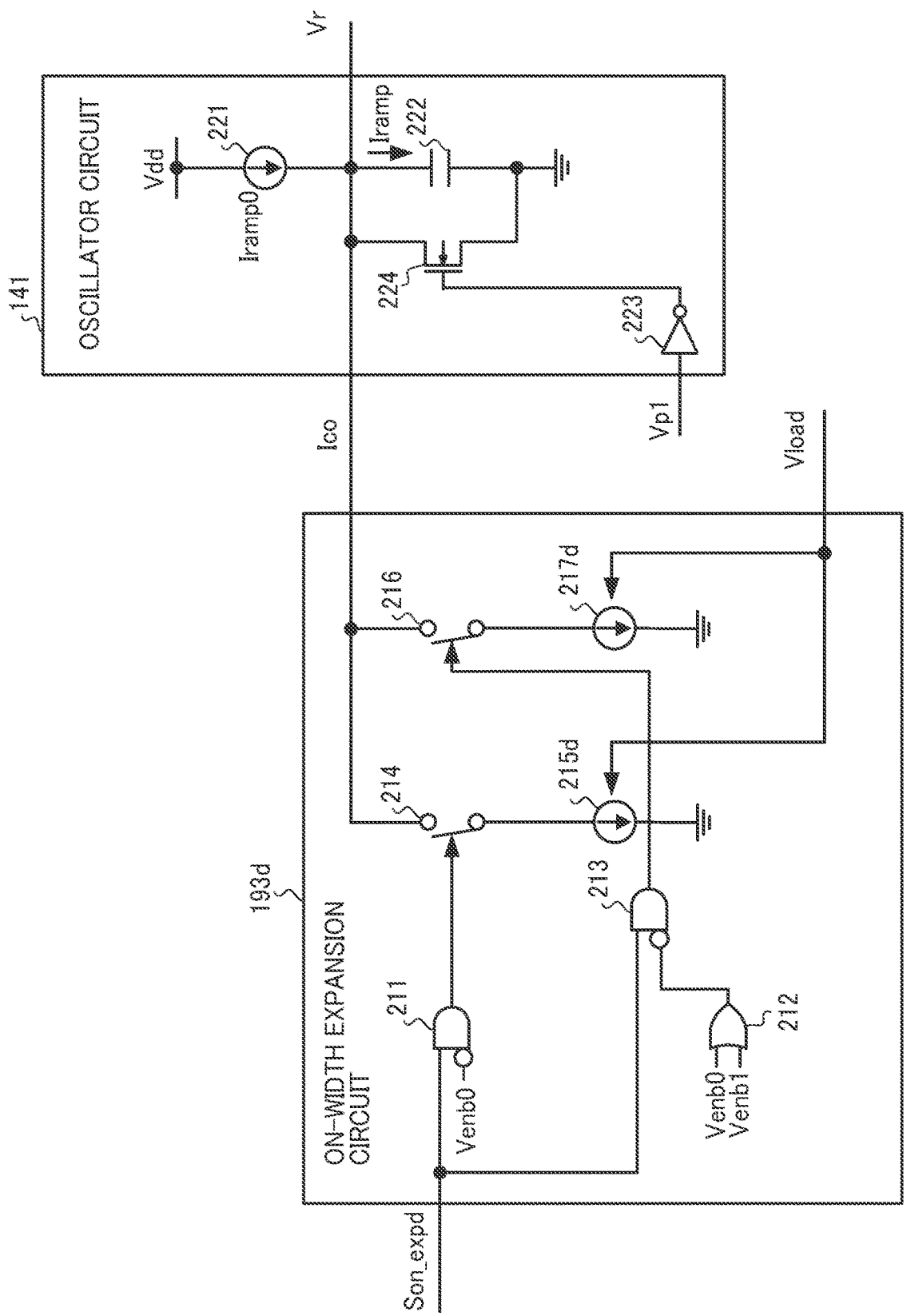
FIG. 26 is a diagram illustrating examples of an oscillator circuit 141 and an on-width expansion circuit 193d.

FIG. 26 is a diagram illustrating examples of the oscillator circuit 141 and an on-width expansion circuit 193d. The on-width expansion circuit 193d is obtained by adding, to the on-width expansion circuit 193c, current sources 215d and 217d, which apply currents varying with the voltage Vload, in place of the current sources 215c and 217c. The on-width expansion circuit 193c and the on-width expansion circuit 193d operate in the same manner except that the current Ico varies with the voltage Vload. In an embodiment of the present disclosure, in response to the load 11 becoming light load state and the output voltage Vout rising, the voltage Vload drops with a drop in the voltage Vcomp. This shortens the time period during which the NMOS transistor 27 is on, to thereby reduce the input current Iin. In order to correct and increase the input current Iin to improve the power factor, the on-width expansion circuit 193d controls the current sources 215d and 217d according to the voltage Vload so as to increase the current Ico. This reduces the slope of the ramp wave Vr to increase the time period during which the driving signal Vp1 is high, to thereby increase the input current Iin. However, the operation of correcting the input voltage Iin according to the state of the load is not limited to such operations.

This can restrain a decrease in the input current Iin caused by a decrease in the difference between the effective value of the AC voltage Vac and the output voltage Vout, since the output voltage Vout rises as the load 11 transitions to the light load state. This makes it possible to appropriately change the input current Iin, to thereby improve the power factor.

<<<<<Correction Circuit 71e>>>>>

Figure 27:
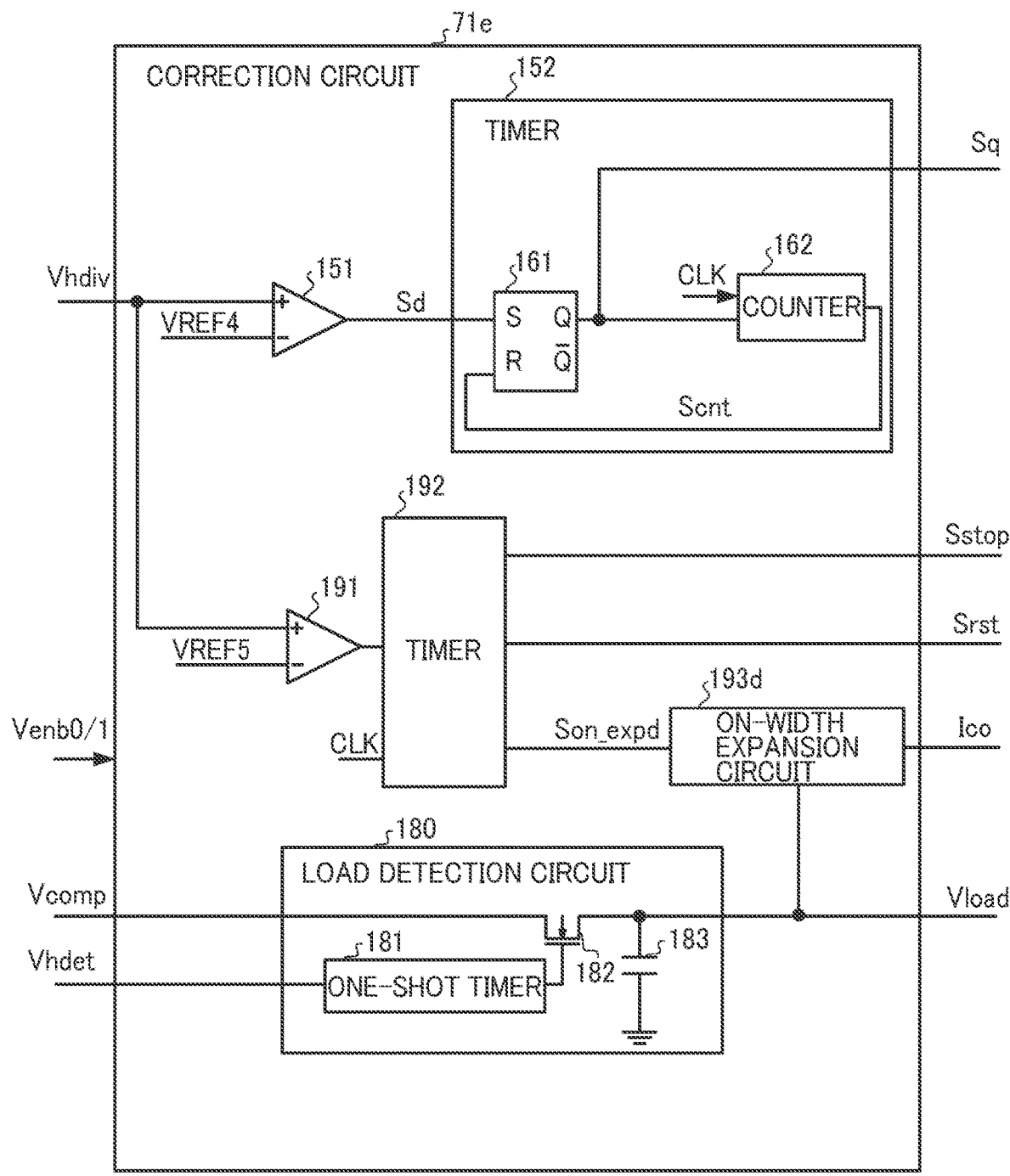
FIG. 27 is a diagram illustrating an example of a correction circuit 71e.

FIG. 27 is a diagram illustrating an example of a correction circuit 71e. The correction circuit 71e is obtained by combining the correction circuits 71a and 71d. Each circuit of the correction circuit 71e operates as described above.

Figure 28:
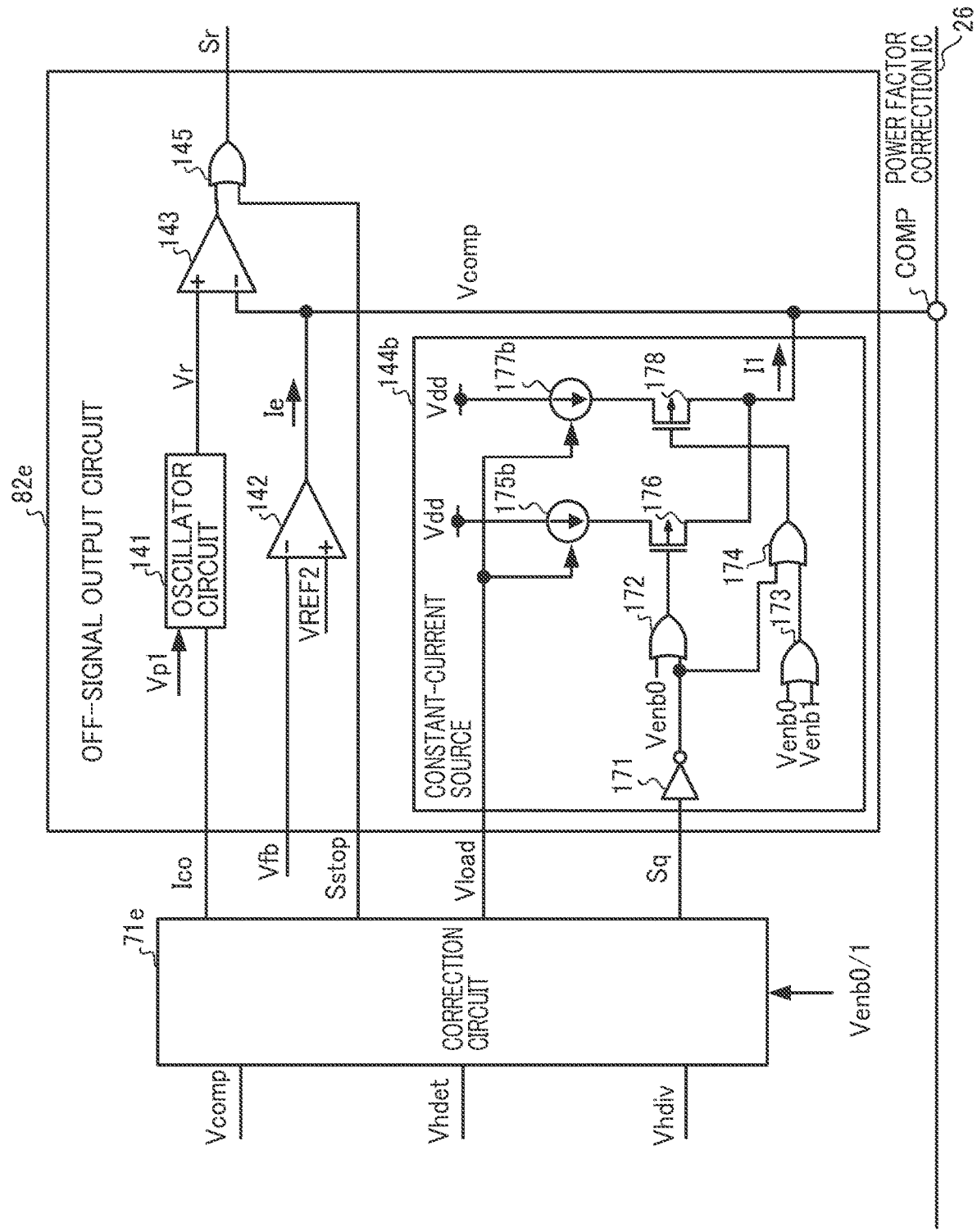
FIG. 28 is a diagram illustrating an example of an off-signal output circuit 82e.

Further, the power factor correction IC 26 uses the correction circuit 71e in place of the correction circuit 71, the on-signal output circuit 81 in place of the on-signal output circuit 80, and an off-signal output circuit 82e in place of the off-signal output circuit 82. The configuration of the off-signal output circuit 82e is as illustrated in FIG. 28. Each circuit of the off-signal output circuit 82e operates as described above.

===Modifications===

In an embodiment of the present disclosure, in the power factor correction IC 26 obtained by combining the correction circuit 71a and the off-signal output circuit 82a, the terminal COMP is charged with the current I1 according to the phase angle of the voltage Vh. However, the time period during which the NMOS transistor 27 is on may be altered by changing the slope of the ramp wave Vr according to the phase angle of the voltage Vh.

In an embodiment of the present disclosure, in the power factor correction IC 26 obtained by combining the correction circuit 71a and off-signal output circuit 82a, the terminal COMP is charged with the current I1 according to the phase angle of the voltage Vh. However, the time period during which the NMOS transistor 27 is on may be altered by adjusting the reference voltage VREF2 of the error output circuit 142 according to the phase angle of the voltage Vh to adjust the voltage at the terminal COMP.

In an embodiment of the present disclosure, the time period during which the NMOS transistor 27 is on is adjusted by PWM control. However, the time period during which the NMOS transistor 27 is on may be adjusted by PFM control in a similar manner.

In an embodiment of the present disclosure, the adjustment circuit 54 is configured to alter the reference signal VREF2 inputted to the error output circuit 142, in response to the signal Venb0. However, the adjustment circuit 54 may be configured to alter the feedback voltage Vfb inputted to the error output circuit 142, in response to the signal Venb0.

An embodiment of the present disclosure uses the comparators 151 and 191, to detect the phase angle of the AC voltage Vac, however, may use a hysteresis comparator with the high reference voltage VREF4 and the low reference voltage VREF5, to detect high and low voltage levels of the voltage Vhdiv.

===Summary===

(1) Hereinabove, the AC-DC converter 10 according to an embodiment of the present disclosure has been described. The identification circuit 51 identifies whether the effective value of the AC voltage Vac is 100 or 200 V. When the effective value of the AC voltage Vac is 200 V, the input current of the AC-DC converter 10 decreases due to a decrease in the difference in voltage between the input and output voltages of the AC-DC converter 10. As the input current decreases, the proportion of charge current to the capacitor 22 increases, to thereby produce pronounced distortion in the input current. Thus, the power factor correction IC 26 corrects the input current based on the identification of the effective value of the AC voltage Vac performed by the identification circuit 51. In other words, it is possible to provide an integrated circuit that appropriately alters the input current to reduce the total harmonic distortion, to thereby improve the power factor.

(2) Furthermore, the correction circuit 71 is enabled or disabled depending on the result of identification performed by the identification circuit 51. This makes it possible to perform control so as to correct the input current when the power factor needs to be improved. When the power factor does not need to be improved, overcorrection of the input current can be avoided.

(3) When the phase angle of the voltage Vh is greater than the phase angle θ1, the correction circuit 71a causes the driving signal output circuit 72 to output the driving signal Vp1 such that the time period during which the NMOS transistor 27 is on is the "time period P2", which is longer than the "time period P1". Thus, the AC-DC converter 10 can be supplied with the increased input current Iin from the commercial power supply. This resolves distortion of the input current Iin of the AC-DC converter 10. Accordingly, the waveforms of the AC voltage Vac and the input current Iin can be shaped so as to be similar.

(4) The comparator 151 is used to detect the phase angle of the voltage Vh based on the voltage at the terminal VH, and a timer is used to measure the "predetermined time period P0". This makes it possible to improve the power factor without using an AD converter, and the power factor correction IC 26 is able to operate with low power consumption.

(5) The off-signal output circuit 82a alters the timing at which the off-signal Sr is outputted to turn off the NMOS transistor according to the phase angle of the voltage Vh. This enables the power factor correction IC 26 to reduce the distortion of the input current Iin without altering the timing at which the on-signal Ss is outputted to turn on the NMOS transistor 27.

(6) The capacitors 33 and 34 are charged with current through the terminal COMP, thereby being able to avoid a rapid change in the timing at which the off-signal Sr is outputted.

(7) The identification circuit 51 identifies which is the effective value the AC voltage Vac, 100, 200, or 277 V. When the effective value of the AC voltage Vac is 277 V, the correction of the input current is enhanced more than the case where the effective value is 200 V. This can restrain degradation of the power factor caused by a decrease in the difference between the input and output voltages.

(8) When the load is in a light load state, the needed input current Iin decreases, which increases the proportion of the current Icap (charge current, for example) to the input current Iin. Thus, when the load is in a light load state, the load detection circuit 180 performs correction to further increase the input current Iin, to thereby improve the power factor when the load is in a light load state.

(9) The use of the voltage Vh obtained by rectifying the AC voltage Vac from the nodes in the previous stage of the full-wave rectifier circuit 21, eliminates the influence of the capacitor 22. Thus, the phase angle is detected more precisely, the level of the voltage Vh is more precise than the rectified voltage Vrec generated through the full-wave rectifier circuit 21 by at least an amount corresponding to the forward voltage of one diode. Accordingly, the time period during which the NMOS transistor 27 is on can be controlled based on the precise voltage Vh.

(10) The voltage at the terminal VH can be used also in the interruption detection circuit 55 that detects interruption of the AC voltage Vac. The discharge circuit 56 discharges the capacitors 41 and 43 to 45 of the input line filter 20.

(11) Since the power factor correction IC 26 includes the voltage divider circuit 50, the comparator 151 can detect the phase angle of the voltage Vh based on the divided voltage Vhdiv. Further the use of the divided voltage Vhdiv restrains application of high voltage to the power factor correction IC 26, and eliminates the need for manufacturing the power factor correction IC 26 through a high voltage process. The resistance value of the voltage divider circuit 50 is large in order to reduce current consumption in the steady state, however, the resistance value of the resistor 125 of the discharge circuit 56 may be small as long as the NMOS transistor 124 can be protected.

(12) The frequency identification circuit 52 identifies the frequency of the AC voltage Vac and switches the clock signal CLK to be used in the counter 162 based on the frequency of the AC voltage Vac.

(13) the timer 152 is able to accurately measure the timing at which the phase angle of the voltage Vh reaches the phase angle θ2, regardless of the frequency of the AC voltage Vac.

(14) The adjustment circuit 54 can reduce a rise in the output voltage Vout caused by correction of the input current.

(15) The adjustment circuit 54 can reduce a rise in the output voltage Vout, by switching the reference voltage according to the target level to the reference voltage according to a predetermined level lower than the target level. In particular, the correction circuit 71a applies additional current to the terminal COMP to increase the voltage Vcomp, to thereby change the switching control such that the voltage Vout increases more than needed. This can be restrained by switching the reference voltage.

(16) The phase angle θ1 is a phase angle determined according to the capacitance value of the capacitor 22, and the phase angle θ2 is greater than the phase angle θ1 and smaller than 180 degrees. This can correct the input current Iin that is the input current Iin after the charge current flowing through the capacitor 22 decreases to the predetermined value Ib or less.

(17) The AC-DC converter 10 includes the identification circuit 51 and signal output circuit 57. This can reduce the total harmonic distortion and improve the power factor.

(18) The power factor correction IC 26 includes the circuit configuration corresponding to the correction circuit 71a. This can also reduce the total harmonic distortion and improve the power factor.

(19) The AC-DC converter 10 includes the circuit configuration corresponding to the correction circuit 71a. This can reduce the total harmonic distortion and improve the power factor.

(20) The correction circuit 71c stops switching the NMOS transistor 27 while the phase angle of the AC voltage Vac is from the phase angle θa to the phase angle θb, to thereby bring the input current Iin close to the current Icap, to correct the input current Iin.

(21) While the phase angle of the AC voltage Vac is from the phase angle θb to the phase angle θc, the correction circuit 71c causes the driving signal output circuit 72 to output the driving signal Vp1 such that the time period during which the NMOS transistor 27 is off is a predetermined time period. Accordingly, the correction circuit 71c gradually increases the inductor current, to reduce distortion of the input current Iin.

(22) While the phase angle of the AC voltage Vac is from the phase angle θc to the phase angle θd, the correction circuit 71c causes the driving signal output circuit 72 to output the driving signal Vp1 to increase the time period during which the NMOS transistor 27 is on. Accordingly, the correction circuit 71c corrects the input current Iin.

(23) The oscillator circuit 141 adjusts the current Iramp flowing through the capacitor 222, to thereby adjust the slope of the ramp wave Vr to increase the time period during which the NMOS transistor 27 is on. This makes it possible to adjust the slope of the ramp wave Vr only when the control by the on-width expansion circuit 193c is needed, and also to finely adjust the slope of the ramp wave Vr.

(24) The correction circuit 71d includes the load detection circuit 180, to thereby control the oscillator circuit 141 according to the state of the load.

(25) The identification circuit 51 identifies which is the effective value the AC voltage Vac, 100, 200, or 277 V.

(26) The phase angle of the voltage Vh based on the voltage at the terminal VH is detected using the comparator 191, and the signals Sstop, Srst, and Son_expd are outputted using the timer 192. This can improve the power factor without using an AD converter, and enables for the power factor correction IC 26 to operate with low power consumption.

(27) The frequency identification circuit 52 identifies the frequency of the AC voltage Vac, and switches the clock signal CLK to be used in the timer 192 based on the frequency of the AC voltage Vac.

(28) The use of the voltage Vh, which is obtained by rectifying the AC voltage Vac from the nodes in the previous stage of the full-wave rectifier circuit 21, eliminates the influence of the capacitor 22, and thus the phase angle is detected more precisely.

(29) The voltage at the terminal VH can be used in the interruption detection circuit 55 that detects interruption of the AC voltage Vac. The discharge circuit 56 discharges the capacitors 41 and 43 to 45 of the input line filter 20.

(30) The power factor correction IC 26 includes the voltage divider circuit 50.

(31) The input current Iin is corrected while charge current flows to the capacitor 22, to thereby reduce the total harmonic distortion and improve the power factor.

(32) The adjustment circuit 54 is able to reduce a rise in the output voltage Vout caused by correction of the input current.

(33) The adjustment circuit 54 switches the reference voltage according to the target level to the reference voltage according to a predetermined level lower than the target level, to thereby reduce a rise in the output voltage Vout.

(34) The power factor correction IC 26 includes the circuit configuration corresponding to the correction circuit 71*c*, to thereby reduce the total harmonic distortion and improve the power factor.

(35) The AC-DC converter 10 includes the circuit configuration corresponding to the correction circuit 71*c*, to thereby reduce the total harmonic distortion and improve the power factor.

(36) The load detection circuit 180 enables correction of the input current Iin according to the state of the load.

(37) The identification circuit 51 identifies which is the effective value the AC voltage Vac, 100, 200, or 277 V.

(38) The identification circuit 51 identifies the effective value of the AC voltage Vac based on the voltage at the terminal VH.

(39) The voltage at the terminal VH can be used in the interruption detection circuit 55 that detects interruption of the AC voltage Vac. The discharge circuit 56 can discharge the capacitors 41 and 43 to 45 of the input line filter 20.

(40) The power factor correction IC 26 includes the voltage divider circuit 50.

(41) The power factor correction IC 26 includes the circuit configuration corresponding to the load detection circuit 180. This can reduce the total harmonic distortion and improve the power factor.

(42) The AC-DC converter 10 includes the circuit configuration corresponding to the load detection circuit 180. This can reduce the total harmonic distortion and improve the power factor.

(43) The adjustment circuit 54 is able to reduce a rise in the output voltage Vout caused by correction of the input current.

(44) The adjustment circuit 54 switches the reference voltage according to the target level to the reference value according to a predetermined level lower than the target level, to thereby reduce a rise in the output voltage Vout.

(45) The power factor correction IC 26 includes the circuit configuration corresponding to the adjustment circuit 54, to thereby also reduce the total harmonic distortion and improve the power factor.

(46) The AC-DC converter 10 includes the circuit configuration corresponding to the adjustment circuit 54, to thereby reduce the total harmonic distortion and improve the power factor.

The present disclosure is directed to provision of an integrated circuit that appropriately alters the input current to reduce the total harmonic distortion and improve the power factor.

According to the present disclosure, it is possible to provide an integrated circuit that appropriately alters the input current to reduce the total harmonic distortion and improve the power factor.

According to the present disclosure, the invention also relates to a power supply circuit configured to generate an output voltage of a target level from an alternating current voltage, the power supply circuit includes a first rectifier circuit configured to perform full-wave rectification to the AC voltage to thereby generate a first rectified voltage;

a first capacitor and an inductor that are configured to receive the first rectified voltage;

a transistor configured to control an inductor current flowing through the inductor;

a signal output circuit configured to, in response to a phase angle of the first rectified voltage being in a range from a first phase angle to a second phase angle, output a driving signal such that a time period during which the transistor is on is longer than a time period during which the phase angle is smaller than the first phase angle; and a driver circuit configured to drive the transistor in response to the driving signal.

According to the present disclosure, in the above invention, the driving signal output circuit is further configured to output the driving signal such that a time period during which the transistor is on is a first time period, based on the feedback voltage and the reference voltage, and the correction circuit is further configured to, responsive to the phase angle of the AC voltage reaching the fifth phase angle and before the phase angle reaching the sixth phase angle, cause the driving signal output circuit to output the driving signal such that the time period during which the transistor is on is a second time period longer than the first time period.

According to the present disclosure, in the above invention, the power supply circuit further includes a second capacitor in connection with the integrated circuit;

the driving signal output circuit includes an on-signal output circuit configured to output an on-signal to turn on the transistor, based on a predetermined condition, an off-signal output circuit configured to output an off-signal to turn off the transistor, based on the feedback voltage, an output circuit configured to output the driving signal, in response to the on-signal and the off-signal, and a control circuit configured to cause the output circuit to output the driving signal to turn off the transistor, in response to the phase angle being in a range from the third phase angle to the fourth phase angle;

the off-signal output circuit includes
a first charge circuit configured to charge the second capacitor with an error current according to the feedback voltage,
an oscillator circuit configured to output a triangular waveform oscillator voltage, in response to the predetermined condition being satisfied, and
a comparator circuit configured to output the off-signal, in response to the oscillator voltage exceeding a voltage across the second capacitor; and the oscillator circuit is configured to, while the phase angle is in a range from the fifth phase angle to the sixth phase angle, output the oscillator voltage such that the time period during which the transistor is on is longer than a time period at least during which the phase angle is in a range from the fourth phase angle to the fifth phase angle.

According to the present disclosure, in the above invention,
the power supply circuit has a load,
the correction circuit further includes a load detection circuit configured to detect a state of the load of the power supply circuit, and
the oscillator circuit outputs the oscillator voltage such that the input current increases as the state of the load transitions to a light load state, based on a result of detection by the load detection circuit.

According to the present disclosure, in the above invention,
the identification circuit is further configured to identify whether the voltage level of the effective value of the AC voltage is a third level higher than the second level, and
the oscillator circuit is configured to, in response to the voltage level of the effective value of the AC voltage being the third level, output the oscillator voltage such that the time period during which the transistor is on increases.

According to the present disclosure, in the above invention, the correction circuit includes
a second detection circuit configured to detect whether the phase angle is greater than the third phase angle, and
a second timer circuit configured to, based on a result of detection by the second detection circuit, measure first to fourth timings corresponding to timings at which the phase angle reaches the third to sixth phase angles, respectively.

According to the present disclosure, the above invention includes a frequency identification circuit configured to identify whether a frequency of the AC voltage is a first frequency or a second frequency higher than the first frequency, wherein
the second timer circuit
measures the first to fourth timings using a first clock signal corresponding to the first frequency, in response to the frequency being the first frequency, and
measures the first to fourth timings using a second clock signal corresponding to the second frequency, in response to the frequency being the second frequency.

According to the present disclosure, in the above invention, the power supply circuit further includes a first rectifier circuit configured to rectify the AC voltage to thereby generate a first rectified voltage;
the integrated circuit further includes a terminal configured to receive the first rectified voltage from the first rectifier circuit;
the identification circuit identifies the voltage level of the effective value of the AC voltage based on a voltage at the terminal; and
the second detection circuit detects whether the phase angle is greater than the third phase angle, based on the voltage at the terminal.

According to the present disclosure, in the above invention, the power supply circuit further includes:
a second rectifier circuit configured to rectify the AC voltage and apply the rectified AC voltage to the first capacitor and the inductor as the rectified voltage, the rectified voltage being a second rectified voltage, and
an input line filter provided between a node that receives the AC voltage and the second rectifier circuit, the input line filter including a third capacitor; and
the integrated circuit further includes:
an interruption detection circuit configured to detect whether the AC voltage is being supplied, based on the voltage at the terminal, and
a discharge circuit configured to discharge the third capacitor of the input line filter, in response to the interruption detection circuit detecting that the AC voltage is not being supplied.

According to the present disclosure, the above invention includes
a voltage divider circuit configured to divide the voltage at the terminal to generate a divided voltage, wherein
the discharge circuit includes
a switch configured to be turned on in response to the interruption detection circuit detecting that the AC voltage is not being supplied, and
a discharge resistor provided between the switch and the third capacitor; and
the voltage divider circuit has a resistance value greater than a resistance value of the discharge resistor.

According to the present disclosure, in the above invention,
the third phase angle is a phase angle greater than 0 degrees, and
the sixth phase angle is a phase angle that is smaller than 90 degrees and at which a charge current to the first capacitor is smaller than a predetermined value.

According to the present disclosure, the above invention further includes
an adjustment circuit configured to alter at least one of the feedback voltage or the reference voltage, so as to decrease the target level of the output voltage, in response to the voltage level of the effective value of the AC voltage being the second level.

According to the present disclosure, in the above invention, the adjustment circuit switches the reference voltage from a first voltage according to the target level to a second voltage of a predetermined level lower than the target level.

According to the present disclosure, the invention also relates to an integrated circuit for a power supply circuit configured to generate an output voltage of a target level from an alternating current voltage, the power supply circuit including
a first rectifier circuit configured to perform full-wave rectification to the AC voltage to thereby generate a first rectified voltage, a phase angle of the first rectified voltage being in a range that includes first to fourth phase angles;
a first capacitor and an inductor that are configured to receive the first rectified voltage, and
a transistor configured to control an inductor current flowing through the inductor, the integrated circuit being configured to switch the transistor, the integrated circuit including:
a signal output circuit configured to
stop outputting a driving signal, while the phase angle of the first rectified voltage changes from the third phase angle to the fourth phase angle, and
output the driving signal, after the phase angle of the first rectified voltage reaches the fourth phase angle; and
a driver circuit configured to drive the transistor in response to the driving signal.

According to the present disclosure, the invention also relates to a power supply circuit configured to generate an output voltage of a target level from an alternating current voltage, the power supply circuit including:
a first rectifier circuit configured to perform full-wave rectification to the AC voltage to thereby generate a first rectified voltage, a phase angle of the first rectified voltage being in a range that includes first to fourth phase angles;
a first capacitor and an inductor that are configured to receive the first rectified voltage;
a transistor configured to control an inductor current flowing through the inductor;
a signal output circuit configured to
stop outputting a driving signal, while the phase angle of the first rectified voltage changes from the third phase angle to the fourth phase angle, and
output the driving signal, after the phase angle of the first rectified voltage reaches the fourth phase angle; and
a driver circuit configured to drive the transistor in response to the driving signal.

According to the present disclosure, in the above invention, the power supply circuit has a load,
the correction circuit further includes a load detection circuit configured to detect a state of the load of the power supply circuit, and
the driving signal output circuit corrects the driving signal such that the input current increases as the state of the load transitions to a light load state, based on a result of detection by the load detection circuit.

According to the present disclosure, in the above invention,
the identification circuit further identifies whether the voltage level of the effective value of the AC voltage is a third level higher than the second level, and
the driving signal output circuit corrects the driving signal such that the input current increase as the state of the load transitions to the light load state, in response to the voltage level of the effective value of the AC voltage being the third level.

According to the present disclosure, in the above invention, the power supply circuit further includes a first rectifier circuit configured to rectify the AC voltage to thereby generate a first rectified voltage;
the integrated circuit further includes a terminal configured to receive the first rectified voltage; and
the identification circuit identifies the voltage level of the effective value of the AC voltage based on a voltage at the terminal.

According to the present disclosure, in the above invention, the power supply circuit further includes:
a second rectifier circuit configured to rectify the AC voltage and apply the rectified AC voltage to the first capacitor and the inductor as the rectified voltage, the rectified voltage being a second rectified voltage, and
an input line filter provided between a node that receives the AC voltage and the second rectifier circuit, the input line filter including a third capacitor; and
the integrated circuit further includes:
an interruption detection circuit configured to detect whether the AC voltage is being supplied, based on the voltage at the terminal, and
a discharge circuit configured to discharge the third capacitor of the input line filter, in response to the interruption detection circuit detecting that the AC voltage is not being supplied.

According to the present disclosure, the above invention further includes a voltage divider circuit configured to divide the voltage at the terminal to generate a divided voltage, wherein
the discharge circuit includes
a switch configured to be turned on in response to the interruption detection circuit detecting that the AC voltage is not being supplied, and
a discharge resistor provided between the switch and the third capacitor; and
the voltage divider circuit has a resistance value greater than a resistance value of the discharge resistor.

According to the present disclosure, the invention also relates to an integrated circuit for a power supply circuit configured to generate an output voltage of a target level from an alternating current voltage, the power supply circuit including
a first capacitor and an inductor that are configured to receive a voltage according to the AC voltage, and
a transistor configured to control an inductor current flowing through the inductor,
the integrated circuit being configured to switch the transistor, the integrated circuit including:
a signal output circuit configured to output a driving signal such that the input current increases as a state of a load of the power supply transitions to a light load state; and
a driver circuit configured to drive the transistor in response to the driving signal.

According to the present disclosure, the invention also relates to a power supply circuit configured to generate an output voltage of a target level from an alternating current voltage, the power supply circuit including:
a first capacitor and an inductor that are configured to receive a voltage according to the AC voltage;
a transistor configured to control an inductor current flowing through the inductor;
a signal output circuit configured to output a driving signal such that the input current increases as a state of a load of the power supply circuit transitions to a light load state; and
a driver circuit configured to drive the transistor in response to the driving signal.

According to the present disclosure, the above invention further includes:
an adjustment circuit configured to alter at least one of the feedback voltage or the reference voltage so as to decrease the target level of the output voltage, in response to the voltage level of the effective value of the AC voltage being the second level.

According to the present disclosure, in the above invention, the adjustment circuit switches the reference voltage from a first voltage according to the target level to a second voltage of a predetermined level lower than the target level.

According to the present disclosure, the invention also relates to an integrated circuit for a power supply circuit configured to generate an output voltage of a target level from an alternating current (AC) voltage, the power supply circuit including
   a first capacitor and an inductor that are configured to receive a voltage according to the AC voltage, and
   a transistor configured to control an inductor current flowing through the inductor,
the integrated circuit being configured to switch the transistor, the integrated circuit including:
   an adjustment circuit configured to alter at least one of a feedback voltage according to the output voltage or a reference voltage according to the target level, so as to decrease the target level of the output voltage;
   a signal output circuit configured to output a driving signal, based on the feedback voltage and the reference voltage; and
   a driver circuit configured to drive the transistor in response to the driving signal.

According to the present disclosure, the invention also relates to a power supply circuit configured to generate an output voltage of a target level from an alternating current voltage, the power supply circuit including:
   a first capacitor and an inductor that are configured to receive a voltage according to the AC voltage;
   a transistor configured to control an inductor current flowing through the inductor;
   an adjustment circuit configured to alter at least one of a feedback voltage according to the output voltage or a reference voltage according to the target level, so as to decrease the target level of the output voltage;
   a signal output circuit configured to output a driving signal, based on the feedback voltage and the reference voltage; and
   a driver circuit configured to drive the transistor in response to the driving signal.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit configured to generate an output voltage of a target level from an alternating current (AC) voltage, the power supply circuit including
   a first capacitor and an inductor that are configured to receive a rectified voltage according to the AC voltage, and
   a transistor configured to control an inductor current flowing through the inductor,
the integrated circuit being configured to switch the transistor, the integrated circuit comprising:
   an identification circuit configured to identify whether a voltage level of an effective value of the AC voltage is a first level or a second level higher than the first level; and
   a signal output circuit configured to
   output a driving signal to drive the transistor, in response to the voltage level of the effective value being the first level, and
   correct the driving signal to thereby correct the input current of the power supply circuit and output the corrected driving signal, in response to the voltage level of the effective value being the second level.

2. The integrated circuit according to claim 1, wherein the signal output circuit includes
   a driving signal output circuit configured to output the driving signal based on at least a feedback voltage according to the output voltage and a reference voltage according to the target level, and
   a correction circuit configured to
      cause the driving signal output circuit to stop correcting the driving signal, in response to the voltage level of the effective value of the AC voltage being the first level, and
      cause the driving signal output circuit to correct the driving signal, in response to the voltage level of the effective value of the AC voltage being the second level.

3. The integrated circuit according to claim 2, wherein the correction circuit is configured to, in response to the voltage level of the effective value of the AC voltage being the second level and a phase angle of the AC voltage being in a range from a first phase angle to a second phase angle, cause the driving signal output circuit to correct the driving signal, such that a time period during which the transistor is on is longer than a time period during which the phase angle is smaller than the first phase angle.

4. The integrated circuit according to claim 3, wherein the correction circuit includes
   a first detection circuit configured to detect whether the phase angle of the AC voltage is greater than the first phase angle, and
   a first timer circuit configured to measure a correction time during which the phase angle changes from the first phase angle to the second phase angle, in response to a result of detection by the first detection circuit; and
   the correction circuit is configured to, while the first timer circuit is measuring the correction time, cause the driving signal output circuit to correct the driving signal such that the time period during which the transistor is on is longer than the time period during which the phase angle is smaller than the first phase angle.

5. The integrated circuit according to claim 4, wherein the driving signal output circuit includes
   an on-signal output circuit configured to output an on-signal to turn on the transistor, based on a predetermined condition,
   an off-signal output circuit configured to output an off-signal to turn off the transistor, based on the feedback voltage, and
   an output circuit configured to output the driving signal in response to the on-signal and the off-signal; and
   the correction circuit is configured to, in response to the phase angle of the AC voltage being in the range from the first phase angle to the second phase angle, cause the off-signal output circuit to output the off-signal, such that the time period during which the transistor is on is longer than the time period during which the phase angle is smaller than the first phase angle.

6. The integrated circuit according to claim 5, wherein the power supply circuit further includes a second capacitor in connection with the integrated circuit; and
   the off-signal output circuit includes
      a first charge circuit configured to charge the second capacitor with an error current, the error current being based on the feedback voltage and the reference voltage according to the target level of the output voltage, a second charge circuit configured to charge the second capacitor with a first current, while the phase angle is in the range from the first phase angle to the second phase angle, an oscillator circuit configured to output a triangular waveform oscillator voltage, in response to the predetermined condition being satisfied, and a comparator circuit configured to output the off-signal in response to the oscillator voltage exceeding a voltage across the second capacitor.

7. The integrated circuit according to claim 6, wherein the identification circuit further identifies whether the voltage level of the effective value of the AC voltage is a third level higher than the second level, and the second charge circuit is configured to, in response to the voltage level of the effective value of the AC voltage being the third level, increase the first current in a case of the voltage level of the effective value of the AC voltage being the second level.

8. The integrated circuit according to claim 6, wherein the power supply circuit has a load, the correction circuit further includes a load detection circuit configured to detect a state of the load of the power supply circuit, and the second charge circuit alters the first current such that the input current increases as the state of the load transitions to a light load state, based on a result of detection by the load detection circuit.

9. The integrated circuit according to claim 4, wherein the power supply circuit further includes a first rectifier circuit configured to rectify the AC voltage to thereby generate a first rectified voltage;

the integrated circuit further includes a terminal configured to receive the first rectified voltage from the first rectifier circuit;

the identification circuit identifies the voltage level of the effective value of the AC voltage based on a voltage at the terminal; and the first detection circuit detects whether the phase angle is greater than the first phase angle, based on the voltage at the terminal.

10. The integrated circuit according to claim 9, wherein the power supply circuit further includes:

a second rectifier circuit configured to rectify the AC voltage and apply the rectified AC voltage to the first capacitor and the inductor as the rectified voltage, the rectified voltage being a second rectified voltage, and an input line filter provided between a node that receives the AC voltage and the second rectifier circuit, the input line filter including a third capacitor; and the integrated circuit further includes:

an interruption detection circuit configured to detect whether the AC voltage is being supplied, based on the voltage at the terminal, and a discharge circuit configured to discharge the third capacitor of the input line filter, in response to the interruption detection circuit detecting that the AC voltage is not being supplied.

11. The integrated circuit according to claim 10, further comprising:

a voltage divider circuit configured to divide the voltage at the terminal to generate a divided voltage, wherein the discharge circuit includes a switch configured to be turned on in response to the interruption detection circuit detecting that the AC voltage is not being supplied, and a discharge resistor provided between the switch and the third capacitor; and the voltage divider circuit has a resistance value greater than a resistance value of the discharge resistor.

12. The integrated circuit according to claim 4, further comprising:

a frequency identification circuit configured to identify whether a frequency of the AC voltage is a first frequency or a second frequency higher than the first frequency, wherein the first timer circuit measures, as the correction time, a first time during which the phase angle of the AC voltage changes from the first phase angle to the second phase angle, in response to the frequency being the first frequency, and a second time during which the phase angle changes from the first phase angle to the second phase angle, in response to the frequency being the second frequency.

13. The integrated circuit according to claim 12, wherein the first timer circuit measures the first time using a first clock signal corresponding to the first frequency, in response to the frequency being the first frequency, and measures the second time using a second clock signal corresponding to the second frequency, in response to the frequency being the second frequency.

14. The integrated circuit according to claim 3, further comprising:

an adjustment circuit configured to alter at least one of the feedback voltage or the reference voltage, so as to decrease the target level of the output voltage, in response to the voltage level of the effective value of the AC voltage being the second level.

15. The integrated circuit according to claim 14, wherein the adjustment circuit switches the reference voltage from a first voltage according to the target level to a second voltage of a predetermined level lower than the target level.

16. The integrated circuit according to claim 3, wherein the first phase angle is a phase angle determined by a capacitance value of the first capacitor, and the second phase angle is greater than the first phase angle and smaller than 180 degrees.

17. The integrated circuit according to claim 2, wherein a phase angle of the AC voltage is in a range that includes first to sixth phase angles; and the correction circuit is further configured to, in response to the voltage level of the effective value of the AC voltage being the second level, cause the driving signal output circuit to stop outputting the driving signal, while the phase angle of the AC voltage changes from the third phase angle to the fourth phase angle, and cause the driving signal output circuit to output the driving signal, after the phase angle of the AC voltage changes reaches the fourth phase angle.

18. The integrated circuit according to claim 17, wherein the correction circuit is further configured to, responsive to the phase angle of the AC voltage reaching the fourth phase angle and before the phase angle reaching a fifth phase angle, cause the driving signal output circuit to output the driving signal such that a time period during which the transistor is off is a predetermined time period.

19. A power supply circuit configured to generate an output voltage of a target level from an alternating current (AC) voltage, the power supply circuit comprising:
a first capacitor and an inductor that are configured to receive a rectified voltage according to the AC voltage;
a transistor configured to control an inductor current flowing though the inductor;
an identification circuit configured to identify whether a voltage level of an effective value of the AC voltage is a first level or a second level higher than the first level; and
a signal output circuit configured to
output a driving signal to drive the transistor, in response to the voltage level of the effective value being the first level, and
correct the driving signal to thereby correct the input current of the power supply circuit and output the corrected driving signal, in response to the voltage level of the effective value being the second level.

20. An integrated circuit for a power supply circuit configured to generate an output voltage of a target level from an alternating current (AC) voltage, the power supply circuit including
a first rectifier circuit configured to perform full-wave rectification to the AC voltage to thereby generate a first rectified voltage,
a first capacitor and an inductor that are configured to receive the first rectified voltage, and
a transistor configured to control an inductor current flowing through the inductor,
the integrated circuit being configured to switch the transistor, the integrated circuit comprising:
a signal output circuit configured to, in response to a phase angle of the first rectified voltage being in a range from a first phase angle to a second phase angle, output a driving signal such that a time period during which the transistor is on is longer than a time period during which the phase angle is smaller than the first phase angle; and
a driver circuit configured to drive the transistor in response to the driving signal.

* * * * *